(12) United States Patent
Katayama et al.

(10) Patent No.: US 9,843,692 B2
(45) Date of Patent: Dec. 12, 2017

(54) IMAGE READING APPARATUS WHICH READS IMAGE ON SHEET CONVEYED THROUGH SHEET CONVEYANCE PATH AND IMAGE FORMING APPARATUS INCLUDING THE SAME

(71) Applicant: CANON KABUSHIKI KAISHA, Tokyo (JP)

(72) Inventors: Masayoshi Katayama, Kashiwa (JP); Akio Ogasawara, Tsukubamirai (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/169,366

(22) Filed: May 31, 2016

(65) Prior Publication Data

US 2016/0360046 A1 Dec. 8, 2016

(30) Foreign Application Priority Data

Jun. 4, 2015 (JP) .................................. 2015-113628
May 13, 2016 (JP) .................................. 2016-097063

(51) Int. Cl.
*G06K 15/00* (2006.01)
*H04N 1/00* (2006.01)
*H04N 1/04* (2006.01)

(52) U.S. Cl.
CPC ......... *H04N 1/0057* (2013.01); *H04N 1/0032* (2013.01); *H04N 1/00533* (2013.01); *H04N 1/00559* (2013.01); *H04N 2201/0094* (2013.01)

(58) Field of Classification Search
CPC .. H04N 1/0057; H04N 1/0032; H04N 1/0464; H04N 1/00533; H04N 1/00559;
(Continued)

(56) References Cited

U.S. PATENT DOCUMENTS 7,616,353 B2 11/2009 Yamanaka et al. ............ 358/474
8,416,476 B2 4/2013 Tamehira et al. ............. 358/498
(Continued)

FOREIGN PATENT DOCUMENTS

JP 2005-184069 7/2005
JP 4235543 B2 3/2009
(Continued)

OTHER PUBLICATIONS

U.S. Appl. No. 15/155,906, filed May 16, 2016.

*Primary Examiner* — Gabriel Garcia
(74) *Attorney, Agent, or Firm* — Fitzpatrick, Cella, Harper & Scinto

(57) ABSTRACT

An image reading apparatus includes a scanner unit including a first image reading portion configured to read an image of a first surface of a document through a first flow-reading glass, an ADF including a second image reading portion disposed on an opposite side of the first image reading portion across a sheet conveyance path and reading an image of a second surface of the document through a second flow-reading glass. The image reading apparatus further includes a gap forming member disposed on either one of the second flow-reading glass and a moving guide unit and abutting with another one of them. The moving guide unit is provided in the scanner unit and is urged by springs to be movable toward the second flow-reading glass.

17 Claims, 17 Drawing Sheets

(58) Field of Classification Search
CPC .......... H04N 1/00795; H04N 1/00909; H04N 1/1235; H04N 2201/0094; H04N 2201/044; H04N 2201/0456
USPC ................................ 358/1.1–1.18, 474, 498
See application file for complete search history.

(56) References Cited

U.S. PATENT DOCUMENTS

| | | | |
|---|---|---|---|
| 2002/0036809 A1* | 3/2002 | Tohyama | H04N 1/0464 358/498 |
| 2006/0071386 A1* | 4/2006 | Mizubata | H04N 1/1215 271/3.14 |
| 2009/0185238 A1* | 7/2009 | Wu | H04N 1/00909 358/474 |
| 2010/0245950 A1* | 9/2010 | Osakabe | H04N 1/0464 358/498 |
| 2016/0360057 A1* | 12/2016 | Ogasawara | H04N 1/00795 |

FOREIGN PATENT DOCUMENTS

| | | |
|---|---|---|
| JP | 2009-253877 | 10/2009 |
| JP | 2010-212846 | 9/2010 |
| JP | 2011-151594 | 8/2011 |
| JP | 4869409 B2 | 2/2012 |

* cited by examiner

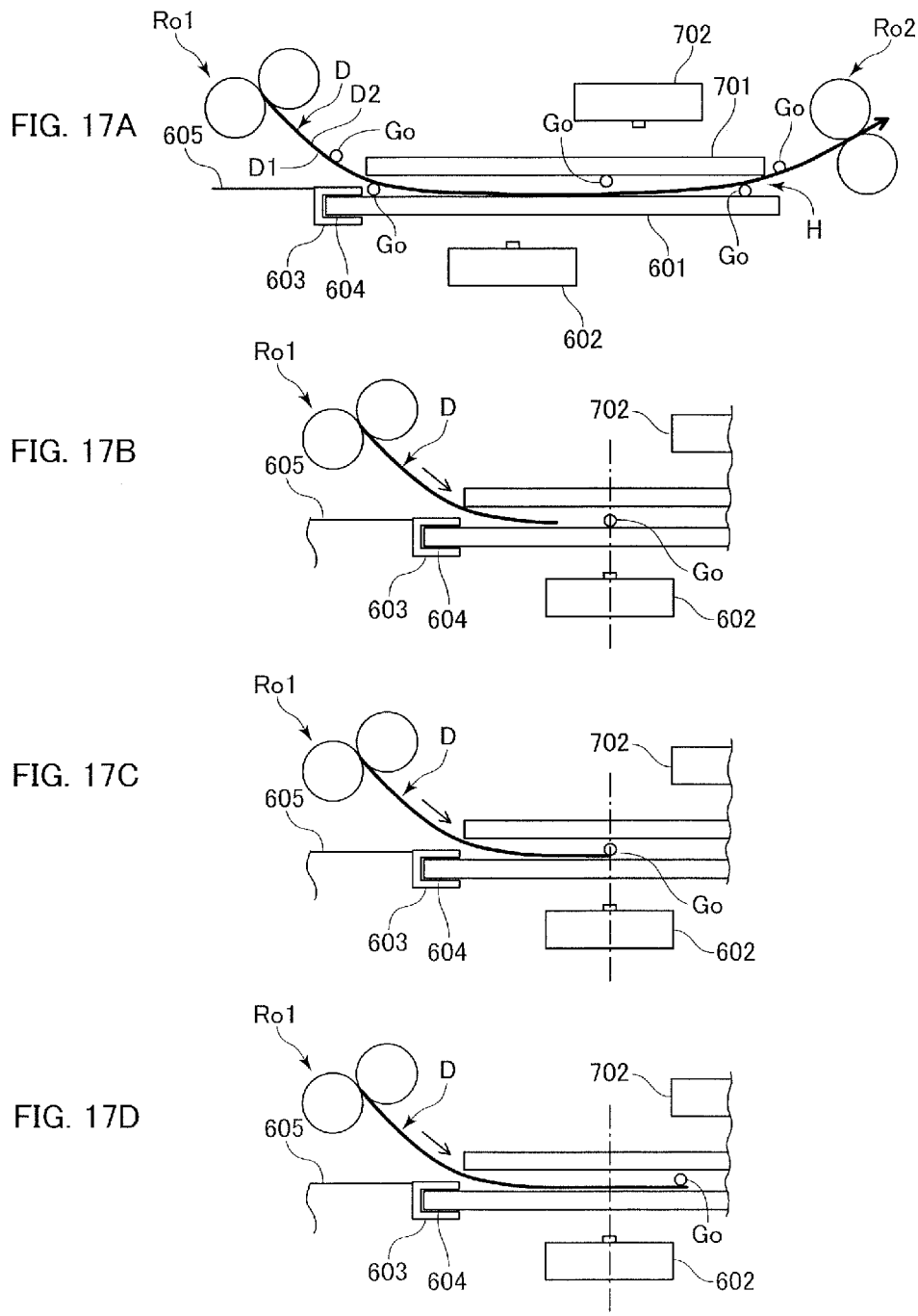

IMAGE READING APPARATUS WHICH READS IMAGE ON SHEET CONVEYED THROUGH SHEET CONVEYANCE PATH AND IMAGE FORMING APPARATUS INCLUDING THE SAME

BACKGROUND OF THE INVENTION

Field of the Invention

The present invention relates to an image reading apparatus reading image information from a sheet such as a document and to an image forming apparatus including the same.

Description of the Related Art

Hitherto, there is known an image reading apparatus including a document feeding apparatus (referred to as an 'ADF' (Auto Document Feeder) hereinafter) such as a double-sided auto document feeder for use in an image forming apparatus such as a digital copier. The image reading apparatus including the ADF of this sort is configured to move an image reading portion provided in a scanner unit under the ADF by a motor to scan a document while conveying the document between a platen roller within the ADF and a document flow-reading glass, and to detect a reflection light thereof by the image reading portion in copying the document within the ADF. Then, the image forming apparatus is configured to obtain a copy image by performing an image forming process in an image forming portion based on data thus detected.

By the way, there is known an image reading apparatus including image reading portions disposed on the ADF side and on the scanner unit side so as to face with each other to read both sides of the document being conveyed simultaneously (consecutively) as disclosed in Japanese Patent No. 4869409 for example. In the image reading apparatus disclosed in Japanese Patent No. 4869409, first and second reading guide portions are disposed at first and second reading positions, respectively, so as to face with each other to suppress defocus from being generated. Then, these first and second reading guide portions are configured to be able to change a gap between them, i.e., to be able to change a gap forming a document conveyance path at the first and second reading positions.

However, the first reading guide portion is provided on the scanner unit side and the second reading guide portion is provided on the ADF side in the image reading apparatus reading the both surfaces of the document simultaneously as disclosed in Japanese Patent No. 4869409. The ADF is provided openably with respect to the scanner unit, and it is difficult to keep a distance of the gap of the document conveyance path favorably at the first and second reading positions in a state in which the ADF is closed with respect to the scanner unit if a relative positional displacement exists between the ADF and the scanner unit. Therefore, if the ADF is displaced relatively from the scanner unit, it is difficult to keep the gap at the both reading positions favorably also in the image reading apparatus disclosed in Japanese Patent No. 4869409. That is, even if an adjustment is made so that the gap at the first reading position becomes favorable in the state in which the ADF is closed with respect to the scanner unit, there is a problem that it is hard to keep the gap composing the document conveyance path at the second reading position favorable due the allowance and others.

SUMMARY OF THE INVENTION

According to one aspect of the invention, an image reading apparatus includes a body unit, an openable unit, a moving guide portion, an urging member, and a gap forming member. A body unit includes a first transparent member, and a first image reading portion configured to read an image of a first surface of a sheet conveyed through a sheet conveyance path through the first transparent member. The openable unit includes a second transparent member, and a second image reading portion disposed on an opposite side of the first image reading portion across the sheet conveyance path. The second image reading portion is configured to read an image of a second surface of the sheet conveyed through the sheet conveyance path through the second transparent member. The moving guide portion is provided in the body unit, disposed to face the second transparent member across the sheet conveyance path, and being movable toward the second transparent member. The urging member is provided in the body unit and urges the moving guide portion toward the second transparent member. The gap forming member is provided on either one of the second transparent member and the moving guide portion, and configured to abut with another one of the second transparent member and the moving guide portion, and to provide a gap through which a sheet passes between the second transparent member and the moving guide portion.

Further features of the present invention will become apparent from the following description of exemplary embodiments with reference to the attached drawings.

BRIEF DESCRIPTION OF THE DRAWINGS

FIG. 17A is a diagram illustrating a configuration of an image reading portion in a first comparative example.

FIG. 17B is a diagram illustrating a state in which a document enters the image reading portion.

FIG. 17C is a diagram illustrating a state in which a leading edge of the document is located at a document reading position of a first image reading portion.

FIG. 17D is a diagram illustrating a state in which the leading edge of the document scrapes a foreign matter.

DESCRIPTION OF THE EMBODIMENTS

First Embodiment

An image reading apparatus and an image forming apparatus of embodiments of the invention will be described below with reference to the drawings. The image forming apparatus of the present embodiment can be configured as a copier, a facsimile, a printer, a multi-function printer or the like, and includes the image reading apparatus having a scanner unit and an auto document feeder (referred to as an 'ADF' hereinafter) capable of feeding a document (sheet-like document) to an image reading portion of the scanner unit. This image reading apparatus is suitably used in an image forming apparatus such as a copier and a facsimile beside a case where the image reading portion is configured as a single unit such as a flatbed scanner including the ADF. It is noted that sizes, materials, shapes, relative dispositions, and the like of components described in the following embodiments are not intended to limit a scope of the invention only to them unless specifically described.

Image Forming Apparatus

Figure 1:
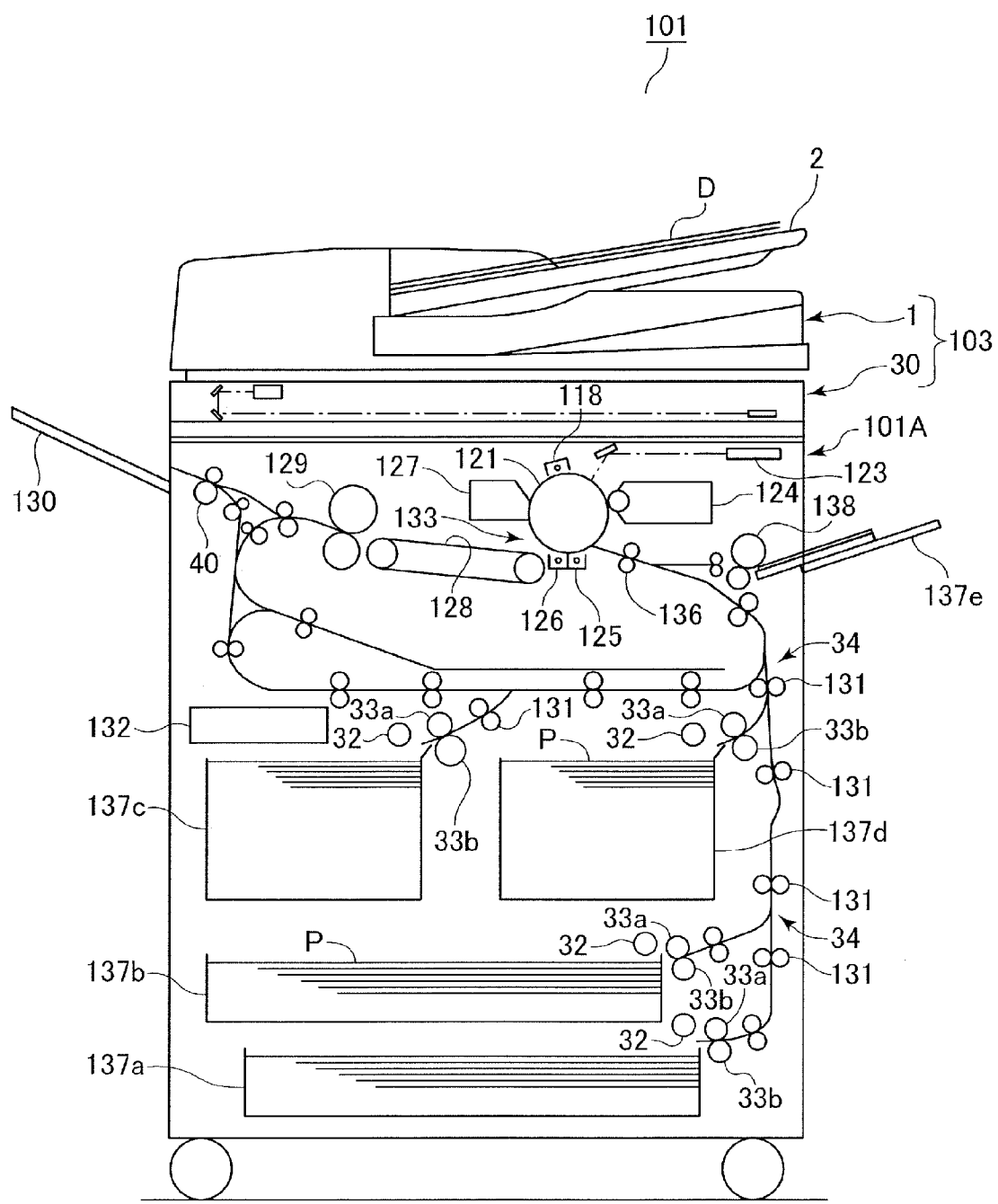
FIG. 1 is a section view diagrammatically illustrating an image forming apparatus of a first embodiment.

A schematic configuration of the image forming apparatus of the present embodiment will be described with reference to FIG. 1. FIG. 1 is a section view taken along a sheet conveyance direction of the image forming apparatus of the first embodiment. It is noted that a position facing an operating portion not illustrated for enabling a user to make various input/setting to the image forming apparatus will be defined as a 'front side' of the image forming apparatus and a back side thereof will be defined as a 'rear side' hereinafter. That is, FIG. 1 illustrates an internal structure of the image forming apparatus seen from the front side. The image forming apparatus illustrated in FIG. 1 will be used in the same manner also in second, third and fourth embodiments described later. It is noted that same components and corresponding parts in the respective drawings will be denoted by same reference numerals, and their overlapped description will be omitted.

As illustrated in FIG. 1, the image forming apparatus 101 includes an image forming apparatus body 101A (referred to simply as an 'apparatus body 101A' hereinafter) and an image reading apparatus 103 provided above the apparatus body 101A. The image reading apparatus 103 includes a scanner unit (a body of the image reading apparatus) 30, and an ADF (a body of the sheet conveying portion) 1 provided above the scanner unit 30. Still further, the image forming apparatus 101 includes a control portion 132 having a CPU, a RAM, and a ROM and controlling the image reading apparatus 103, the apparatus body 101A, and others.

The ADF 1 is configured to automatically feed a document (sheet) D stacked on a document feed tray 2 to the scanner unit 30. The scanner unit 30 is configured to receive a reflection light of a light irradiated to the document D being conveyed at an image reading position to optically read the document D. The scanner unit 30 then converts the optically read signal into an electrical signal and prepares an image data (image read information) based on the electrical signal. It is noted that the specific configurations of the ADF 1 and the scanner unit 30 are described later.

The apparatus body 101A includes an image forming portion 133 forming an image on a sheet P, i.e., a recording medium, and a sheet feed portion 34 feeding the sheet P to the image forming portion 133. The sheet feed portion 34 includes sheet loading portions 137a, 137b, 137c, and 137d in which the sheets are loaded, feed rollers 32 feeding the sheets within the respective sheet loading portions 137a through 137d and feed and separation rollers 33a and 33b conveying while separating the sheets one by one. The apparatus body 101A also includes a discharge roller pair 40 discharging the sheet P onto which the image has been formed out of the apparatus body 101A (out of the apparatus) and a discharge tray 130 in which the discharged sheet P is stacked. The apparatus body 101A is configured so as to form a copy image on the sheet P by the image forming portion 133 based on the image data.

The image forming portion 133 includes a photosensitive drum 121, a charger 118, a developer 124, a transfer charger 125, and a separation charger 126 disposed around the photosensitive drum 121. In the apparatus body 101A, the exposure unit 123 is actuated based on an electrical signal and image data of the image of the document D to form an electrostatic latent image on a surface of the photosensitive drum 121 being rotated. The electrostatic latent image is developed (by supplying toner) by the developer 124 as a toner image. It is noted that the image forming portion 133 and the fixing portion 129 compose an image forming unit forming an image on the sheet P based on image information read from the document D by the image reading apparatus 103.

The sheet loading portions 137a, 137b, 137c, and 137d loading the sheets P of various sizes are disposed under the apparatus body 101A. The sheet P stored in the respective sheet loading portions 137a through 137d is delivered one by one by the corresponding feed roller 32 and is passed to the corresponding conveyance and separation roller 33a and 33b. The sheet P is fed also from a manual feed tray 137e by a separation feed roller pair 138.

The sheet P fed from the respective sheet loading portions 137a through 137d or the manual feed tray 137e is conveyed to the registration roller pair 136 through the corresponding conveyance roller pair 131. The registration roller pair 136 corrects a skew of the sheet P and supplies the sheet P between the photosensitive drum 121 and the transfer charger 125 by synchronizing the sheet P with the toner image on the photosensitive drum 121. The toner image on the photosensitive drum 121 is transferred onto the sheet P by the transfer charger 125, and the separation charger 126 separates the sheet P from the photosensitive drum 121. The cleaner 127 cleans the surface of the photosensitive drum 121 on which the toner image has been transferred. Then, the charger 118 charges the surface of the photosensitive drum 121 to be ready for next exposure.

The sheet P onto which the toner image has been transferred is conveyed by the belt conveyance portion 128 to the fixing portion 129. The sheet P receives heat and pressure in the fixing portion 129 to fix the toner image on a surface of the sheet P. Then, the sheet P on which the toner image has been fixed is discharged to the discharge tray 130 through the discharge roller pair 40.

Image Reading Apparatus

Next, the ADF 1 and the scanner unit 30 of the present embodiment will be described below in detail with reference to FIGS. 3 and 4. It is noted that FIG. 3 illustrates a configuration of an entire image reading apparatus 103 of the present embodiment, and FIG. 4 is an enlarged view illustrating an image reading portion of the present embodiment.

As described above, the image reading apparatus 103 is composed of the scanner unit 30, i.e., one example of a body unit, and the ADF 1, i.e., one example of an openable unit portion configured to be openable unit with respect to the scanner unit 30. That is, in the image reading apparatus 103, the ADF 1 is turnably supported to the scanner unit 30 by a hinge mechanism 11 described later and disposed on a rear side such that a platen glass 213 is openable from a front side. For the image reading apparatus 103, a dual-scan system of reading both images on a surface (first surface D1) and on a back surface (second surface D2) (see FIG. 7D) by providing first and second image reading portions 151 and 201 at two places facing a document conveyance path H. The scanner unit 30 and the ADF 1 will be described specifically below.

Figure 3:
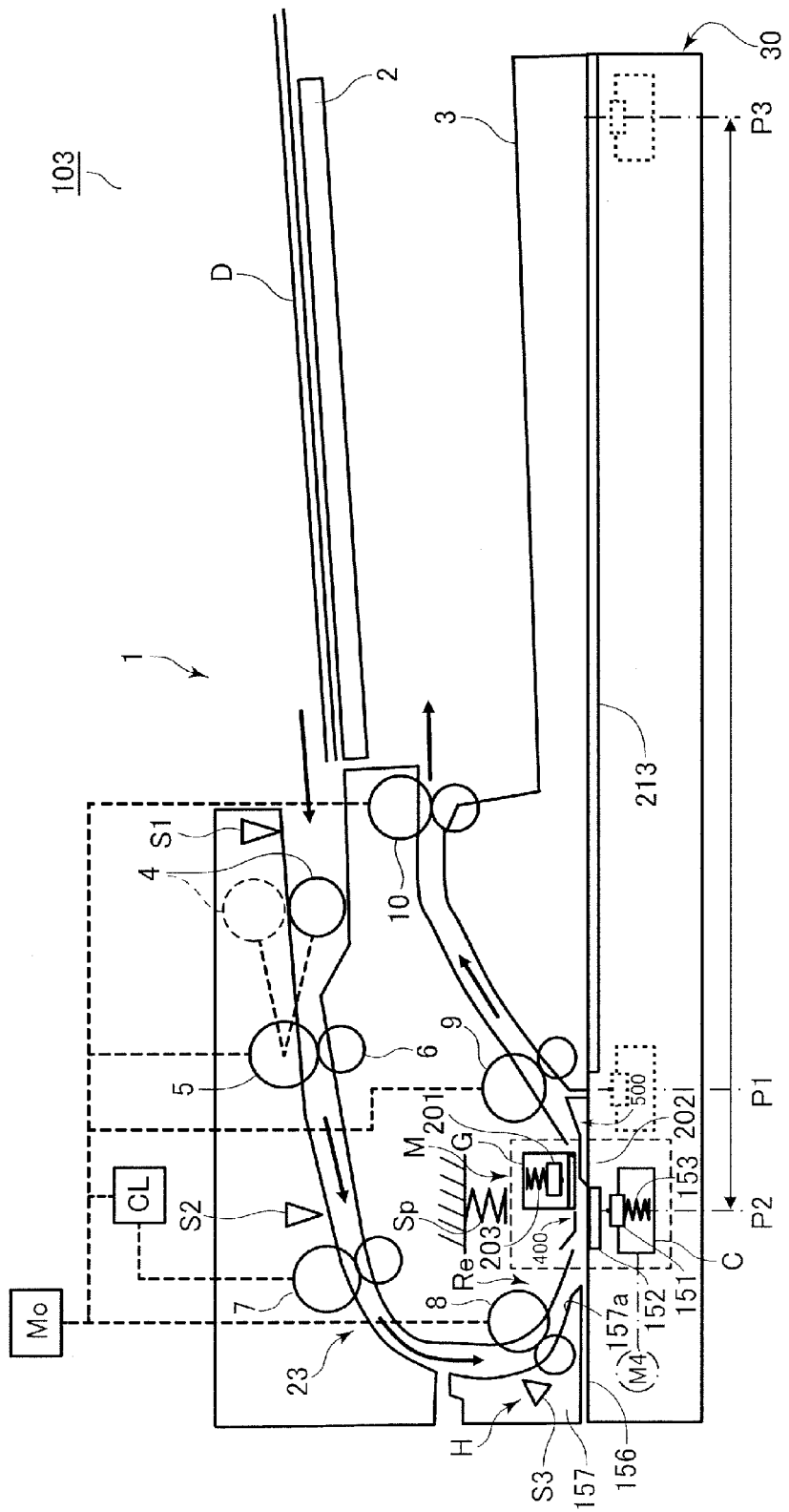
FIG. 3 illustrates a configuration of an image reading apparatus of the first embodiment.
Figure 4:
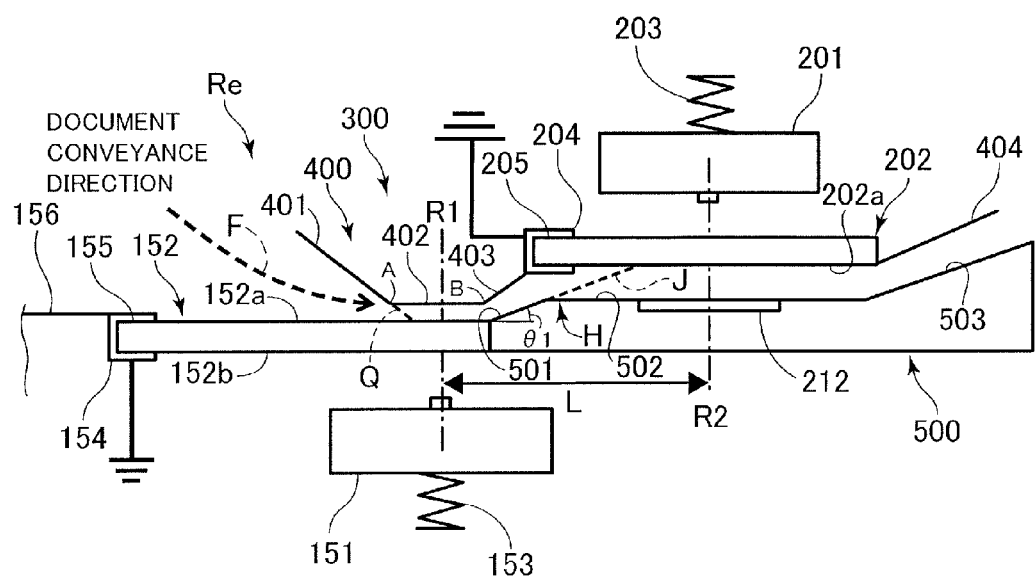
FIG. 4 is an enlarged view illustrating an image reading portion of the first embodiment.

As illustrated in FIGS. 3 and 4, the ADF 1 is configured to feed the document D automatically to a first image reading position R1 where the document D is read by the first image reading portion 151 and to a second image reading position R2 where the document D is read by the second image reading portion 201. The ADF 1 includes an auto document conveyance portion (a document feed portion 23) extending thin and long along a width direction of the document D. The auto document conveyance portion includes a document feed roller 4, a separation roller 5, a retard roller 6, a registration roller pair 7, conveyance roller pairs 8 and 9, and a discharge roller pair 10.

The document feed roller 4 is supported movably from a broken line position to a solid line position as illustrated in FIG. 3 to feed the document D loaded on the document feed tray 2. The separation roller 5 and the retard roller 6 separate the document D delivered from the document feed tray 2 by the document feed roller 4 one by one. The registration roller pair 7 is disposed downstream of the separation roller 5 and the retard roller 6 to correct a skew of the document D. The discharge roller pair 10 is disposed downstream of the conveyance roller pair 9 and discharges the document D whose image has been read to the document discharge portion 3. Attached so as to project approximately in a horizontal direction in a cantilever condition at an upper position on one end surface side (right end surface side in FIG. 3) of the auto document conveyance portion is a document feed tray 2 on which the document D whose image is to be read is loaded.

The scanner unit 30 includes a first flow-reading glass (platen glass) 152 as a first transparent member and a platen glass 213 disposed in parallel with the first flow-reading glass 152 in a sub-scan direction (in a left-right direction in FIG. 3). The first image reading portion 151 is configured to read an image of the first surface D1 of the document D conveyed through the document conveyance path H, i.e., a sheet conveyance path, through the first flow-reading glass (first transparent member) 152. Still further, the second image reading portion 201 is disposed downstream in a document conveyance direction (direction indicated by an arrow F in FIG. 4) of the first image reading portion 151 and on an opposite side of the first image reading portion 151 across the document conveyance path H. The second image reading portion 201 is configured to read an image of the second surface D2 of the document D conveyed through the document conveyance path H through the second flow-reading glass (second transparent member) 202.

The first image reading portion 151 adopts a contact image sensor (referred to as a 'CIS' hereinafter) of unmagnification optical system. This CIS is what reads image information by illuminating light to an image information surface of the document D from a LED array, i.e., a light source, not illustrated and imaging a reflection light reflected from the image information surface by a sensor element (the photoelectric conversion element 15, see FIG. 2). The CIS is used also in the second image reading portion 201 similarly to the first image reading portion 151. The first and second image reading portions 151 and 201 of the present embodiment are configured to focus of a reading optical system to image reading surfaces of the document D being conveyed through the first and second flow-reading glasses 152 and 202.

The first image reading portion 151 is connected with a driving belt not illustrated. The first image reading portion 151 is configured to be movable between a document flow-reading position P2 under the first flow-reading glass 152, a position P1, and a terminal position P3 under the platen glass 213 as a driving motor M4 provided in the scanner unit 30 drives under control of the control portion 132. The document flow-reading position P2 is the first image reading position R1. The first image reading portion 151 is configured to read the image of the first surface D1 of the document D being conveyed through the document conveyance path H at the document flow-reading position P2 (the first image reading position R1) through the first flow-reading glass 152. The control portion 132 is enabled to understand the position of the first image reading portion 151 by a position sensor not illustrated and a number of rotation pulses of the driving motor M4.

In the present embodiment, a mode of reading the image while moving the document D on the first flow-reading glass 152 by the ADF 1 in a state in which the first image reading portion 151 is halted at the document flow-reading position P2 will be referred as a 'skimming' mode. A mode of reading the image by loading the document D on the platen glass 213 and by moving the first image reading portion 151 in a horizontal direction in FIG. 3 between the position P1 and the terminal position P3 will be referred to as a 'fixed reading' mode.

The ADF 1 includes a document feed tray 2, a document feed portion 23, and a document discharge portion 3. The document D to be read (in a flow-reading mode) is loaded on the document feed tray 2. The document feed portion 23 feeds the document D to a predetermined image reading position (the document flow-reading position P2, the first image reading position R1) through the document conveyance path H in reading (skimming) the document D. The document D which has been read (skimmed) is discharged and stacked on the document discharge portion 3. The ADF 1 is also configured to be able to press the document D by a resin plate not illustrated such that the document D placed on the platen glass 213 does not move in reading the document D in the fixing reading mode.

The document discharge portion 3 disposed under the document feed tray 2 receives the document D whose images have been read at the first and second image reading positions R1 and R2 and which has sent out of the auto document conveyance portion. The first and second flow-reading glasses 152 and 202 which are transparent and guiding the document D are disposed at the first and second image reading positions R1 and R2 so as to face with each other and to sandwich the document conveyance path H. The document discharge portion 3 is attached so as to project approximately horizontally from a lower position of one end surface side of the auto document conveyance portion and is constructed such that the document D discharged on an upper surface of the document discharge portion 3 is stacked. The document feed tray 2 and the document discharge portion 3 are disposed so as to face vertically with each other with an adequate distance and are disposed so as to almost overlap with each other in a plan view.

Image Reading Position

Next, a case when the ADF 1 conveys the document D to the first and second image reading portions 151 and 201 to consecutively read the first and second surfaces D1 and D2 of the document D will be described with reference to FIG. 3.

As illustrated in FIG. 3, a plurality of documents D is loaded and is layered on the document feed tray 2. With a read mode selected by a user, the control portion 132 (see FIG. 1) judges whether or not the document D is present by a document detection sensor S1 located upstream of the document feed roller 4. When the control portion 132 judges that the document D is detected, the first image reading portion 151 located at the position P1 of the scanner unit 30 is moved toward the document flow-reading position P2 by being guided by a shaft portion not illustrated in a state in which the first image reading portion 151 is carried on a carriage C rockably supported.

Then, the document feed roller 4 is lowered from the position of the broken line to the position of the solid line in FIG. 3 under the control of the control portion 132 and feeds the document D to an inlet side conveyance pass space to the document feed portion 23. Then, the document D is conveyed by a rotational driving force of the document feed roller 4 to the separation roller 5 of the document feed portion 23. Here, the document D is separated one by one by a friction force between the separation roller 5 and the retard roller 6 urged from underneath by a spring. The document D thus separated one by one is conveyed such that a leading edge thereof abuts against the registration roller pair 7 whose rotation is being. With rotation of the registration roller pair 7 by being driven by the driving motor Mo under control of the control portion 132, the leading edge of the document D being conveyed by the registration roller pair 7 is detected as follows. That is, it is detected by a flag not illustrated of the document detection sensor S2 installed upstream, in a document conveyance direction (direction indicated by an arrow F), of the registration roller pair 7.

Then, the rotation of the registration roller pair 7 is stopped for a certain period of time because transmission of drive of the driving motor Mo is cut off by the electromagnetic clutch CL connected between the driving motor Mo and the registration roller pair 7 as illustrated in FIG. 3 and actuated under control of the control portion 132. Because the document D is kept being conveyed by the separation roller 5 during when the registration roller pair 7 is stopped, the document D forms a loop and thereby, a skew of the document is removed (skew correction). It is noted that the driving motor Mo actuated under the control of the control portion 132 also rotates the separation roller 5, the conveyance roller pair 8, the conveyance roller pair 9, and the discharge roller pair 10 as illustrated in FIG. 3. Then, the driving motor Mo rotates the document feed roller 4 through the separation roller 5 and the registration roller pair 7 through the electromagnetic clutch CL.

A document detection sensor S3 is disposed between the registration roller pair 7 and the conveyance roller pair 8 in the document feed portion 23. The first and second image reading positions R1 and R2 are provided between the conveyance roller pair 8 and the conveyance roller pair 9 (see FIG. 4). As described above, the first image reading position R1 is the position where the first image reading portion 151 of the scanner unit 30 reads the first surface D1 of the document D (see FIG. 7, and the second image reading position R2 is the position where the second image reading portion 201 of the ADF 1 reads the second surface D2 of the document D.

The document D whose skew has been corrected is conveyed by the registration roller pair 7 to the conveyance roller pair 8. Based on a detection of the document detection sensor S3, the control portion 132 adjusts a reading timing of the leading edge of the document D and the first image reading position R1 and feeds the document D to the first image reading position R1 while controlling the drive of the conveyance roller pair 8. The document D is conveyed by the conveyance roller pair 9 in a state in which images of the both surfaces of the document D are read at the first and second image reading positions R1 and R2. The document D is then discharged by the discharge roller pair 10 sequentially onto the stacking surface of the document discharge portion 3.

By the way, in a case of reading the document D through a pressure plate (the platen glass 213 part) of the scanner unit 30, the ADF 1 is turned up centering on a hinge mechanism 11 (see FIG. 5) to open the ADF 1 from the scanner unit 30, and then the document D is placed on the platen glass 213. Then, the ADF 1 is turned down to the scanner unit 30 to close the ADF 1. Then, when the user makes a copying operation, the first image reading portion 151 being standing by at the position P1 is guided by a shaft not illustrated in a state being carried on the carriage C being rockably supported. That is, the first image reading portion 151 moves to the terminal position P3 while reading an image of the document D. As a result, the image of the document D on the platen glass 213 is read by the first image reading portion 151.

Hinge Mechanism

Figure 5:
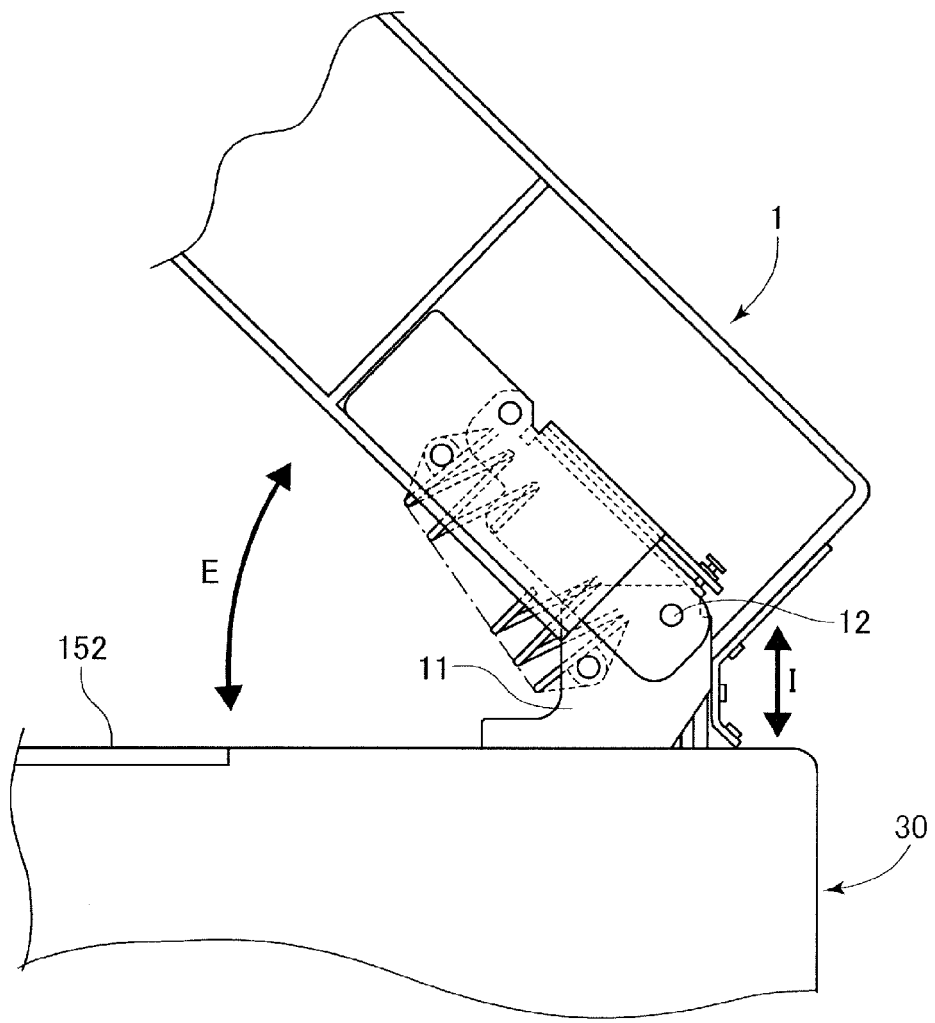
FIG. 5 is a section view illustrating a hinge mechanism of the first embodiment.

Here, the hinge mechanism 11 will be described with reference to FIG. 5. FIG. 5 is a diagram illustrating the hinge mechanism 11 of the present embodiment. As illustrated in FIG. 5, the hinge mechanism 11 connects the ADF 1 with the scanner unit 30 at the rear side of the image reading apparatus 103 and supports the ADF 1 turnably in a direction of an arrow E with respect to the scanner unit 30 centering on a rotational shaft 12. Thereby, the ADF 1 is configured to be openable with respect to the platen glass 213 (see FIG. 3) of the scanner unit 30 side. The hinge mechanism 11 is also attached to be movably in a direction of an arrow I (vertical direction) with respect to the scanner unit 30 to be able to handle a case of reading a thick document D.

Reading Configuration of ADF and Image Reading Apparatus

Next, a structure in a vicinity of the reading portions of the ADF 1 and the scanner unit 30 of the present embodiment will be described in detail with reference to FIGS. 3 and 4.

As illustrated in FIGS. 3 and 4, the second image reading portion 201 is configured such that no foreign matter generated in conveying a document in the document feed portion 23 including the document conveyance path H infiltrates into a reading region of the second image reading portion 201 and into a back surface and others of the second flow-reading glass 202. In order to realize such configuration, the second image reading portion 201 is stored within a cover module M sealed by a sealed guide G and the second flow-reading glass 202. The sealed guide G and the second flow-reading glass 202 are fixed by adhesive and the like in order to fill gaps between them for example.

A signal cable from the second image reading portion 201 is connected with an image processing portion not illustrated provided within the image forming apparatus 101 via an opening not illustrated provided through a part of the sealed guide G. A part surrounding the opening is covered by an elastic member such as sponge so as to surround the signal cable to prevent the infiltration of the foreign matters such as paper dust.

A compression spring 203 for pressing the second image reading portion 201 to the second flow-reading glass 202 is provided in compression within the sealed guide G. The second image reading portion 201 is in contact with the back side of the second flow-reading glass 202 through a spacer not illustrated. The cover module M is also pressed in a direction of the first flow-reading glass 152 by a pressure spring Sp whose one end is connected within a conveyance frame not illustrated of the ADF 1.

Here, a part of the sealed guide G and a part of the upstream conveyance guide 400 are provided with projections to assure a gap of the document conveyance path H formed by the first and second flow-reading glasses 152 and 202 by abutting the projections against the first flow-reading glass 152. Still further, as illustrated in FIG. 4, a white sheet member 212 is provided under the second flow-reading glass 202 to prevent showing through of a thin sheet in reading the back surface of the document D by the second image reading portion 201.

The upstream conveyance guide 400 described above is provided so as to project upstream in the document conveyance direction from a part of the sealed guide G. As described in detail later, the upstream conveyance guide 400 includes an upstream inclined guide surface 401 guiding the leading edge of the document D being conveyed to the read portion Re to the first image reading position R1 of the first image reading portion 151. It is noted that the upstream conveyance guide 400 may be made of a thin plate-like member, a thin synthetic resin member, or the like.

As described above, the first image reading portion 151 provided in the scanner unit 30 is moved to the first image reading position R1 (see FIG. 4) under the control of the control portion 132 in reading the document D. Still further, the second image reading portion 201 provided in the ADF 1 reads an image of the document D at the second image reading position R2 (see FIG. 4). A distance L (see FIG. 4) between the first and second image reading positions R1 and R2 is determined by an adequate distance by which the first and second image reading portions 151 and 201 are not affected by illuminations not illustrated and provided in the first and second image reading portions 151 and 201. The distance is set at L=15.5 mm in the present embodiment for example.

The first and second image reading portions 151 and 201 are disposed so as to face each other across the document conveyance path H as described above. Still further, the first flow-reading glass 152 is disposed between the first image reading portion 151 and the document conveyance path H, and the second flow-reading glass 202 is disposed between the second image reading portion 201 and the document conveyance path H. The first and second flow-reading glasses 152 and 202 may be composed of plate glasses, respectively.

A downstream conveyance guide 500 which is adjacent to the first flow-reading glass 152 and a part of which is inclined in the document conveyance direction is disposed along the document conveyance path H. The downstream conveyance guide 500 and the second flow-reading glass 202 are disposed so as to face with each other across a gap. Still further, the first flow-reading glass 152 and the upstream conveyance guide 400 are disposed so as to face with each other across a gap. The document D is read while being conveyed through the gaps formed by the first flow-reading glass 152 and the upstream conveyance guide 400 and by the second flow-reading glass 202 and the downstream conveyance guide 500. That is, the images of the document D are read respectively from the first and second surfaces D1 and D2 by the first and second image reading portions 151 and 201. It is noted that the downstream conveyance guide 500 composes a first conveyance guide portion, and the upstream conveyance guide 400 composes a second conveyance guide portion. These upstream and downstream conveyance guides 400 and 500 compose a conveyance guide (the conveyance guide portion) 300.

The upstream conveyance guide 400 includes an upstream inclined guide surface (second inclined guide surface) 401 composing the document conveyance path H, disposed on a side facing the downstream conveyance guide 500, and inclined to be able to guide the leading edge of the document D being conveyed in a direction in which the leading edge of the sheet abuts against the first flow-reading glass 152. Thereby, it is possible to guide the leading edge of the document D being conveyed so as to abut against the first flow-reading glass 152 in high precision. The downstream conveyance guide 500 includes an upstream inclined guide surface (inclined guide surface, first inclined guide surface) 501 inclined to be able to guide the leading edge of the document D passing through the first flow-reading glass 152 while being in sliding contact with the first flow-reading glass 152 in a direction in which the leading edge of the sheet abuts against the second flow-reading glass 202. Thereby, it is possible to guide the leading edge of the document D being conveyed so as to abut against the second flow-reading glass 202 in high precision.

In the present embodiment, the gap between the first flow-reading glass 152 and a parallel guide surface 402 of the upstream conveyance guide 400 that runs in parallel with the first flow-reading glass 152 is set at 0.6 mm for example. Still further, the gap between the second flow-reading glass 202 and a parallel guide surface 502 of the downstream conveyance guide 500 that runs in parallel with the second flow-reading glass 202 is set at 0.8 mm for example.

The first image reading portion 151 is pressed and urged in the direction of the first flow-reading glass 152 by a compression spring 153 provided within the carriage C (see FIG. 3). The first image reading portion 151 is provided with spacers not illustrated at both ends thereof so as to abut against the first flow-reading glass 152 to assure an adequate focal distance from the first surface D1 of the document D passing through the document conveyance path H.

Meanwhile, the second image reading portion 201 is pressed and urged in the direction of the second flow-reading glass 202 by a compression spring 203 provided within the sealed guide G (see FIG. 3). The second image reading portion 201 is provided with spacers not illustrated at both ends thereof so as to abut against the second flow-reading glass 202 to assure an adequate focal distance from the second surface D2 of the document D passing through the document conveyance path H (see FIG. 7).

CIS Used in First and Second Image Reading Portions

Figure 2A:
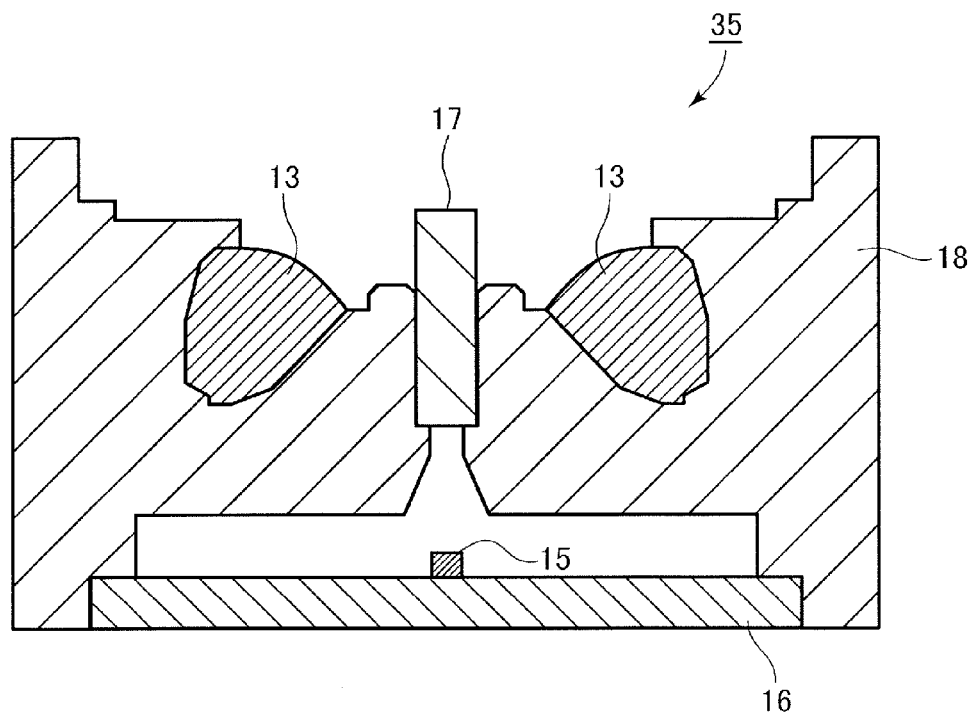
FIG. 2A illustrates a CIS (contact image sensor) of the first embodiment.
Figure 2B:
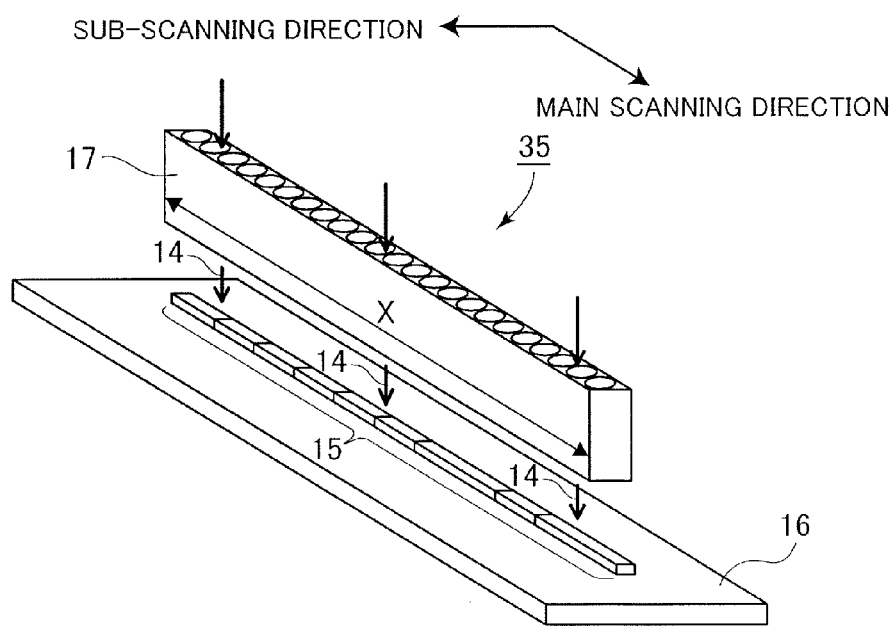
FIG. 2B is a partially omitted perspective view of the CIS illustrated in FIG. 2A.

The structure of the CIS 35 used in the first and second image reading portions 151 and 201 described above will be described in detail with reference to FIGS. 2A and 2B. It is noted that FIG. 2A is a diagram illustrating the CIS 35 of the present embodiment, and FIG. 2B is a partially omitted perspective view of the CIS 35 in FIG. 2A.

In the present embodiment, the CIS (Contact Image Sensor) 35 is used as one example of the image reading portion. As illustrated in FIG. 2A, the CIS 35 includes a frame 18 to which a lighting system, composed of a light source using LEDs not illustrated and irradiating light to the document D and a photoconductor 13, is attached. The photoconductor 13 takes in output light from the light source and outputs the light such that a quantity of irradiated light is approximately homogenized across a length in a main scan direction of a document reading region.

Still further, a sensor substrate 16 on which a sensor array is mounted and a lens array 17 imaging an optical image of the document D on the sensor array are disposed in the frame 18. The sensor array is formed by linearly disposing a plurality of photoelectric conversion elements 15 each including a photo-detector that photo-electrically converts an optical image 14 (FIG. 2B) of the document D into electrical signals. The sensor substrate 16, the lens array 17 and others are provided along the main scan direction in forming an image by the image forming portion 133 (FIG. 1) as illustrated in FIG. 2B.

Here, the image reading region of the document D by the CIS 35 indicates a region in which the photoelectric conversion elements 15 are disposed. The photoelectric conversion elements 15 are set such that end surfaces thereof in the main scanning direction are longer than a width of the document D by about 3 mm for example to be able to read an image even if the document D being conveyed in the sub-scanning direction is skewed.

The image reading region of the present embodiment is a length X in which the photoelectric conversion elements 15 are disposed in the main scanning direction as illustrated in FIG. 2B. Here, in a case of a CIS capable of reading a document D of A4 size for example and a short-side direction thereof is the main scanning direction in which the document D is scanned, the photoelectric conversion elements 15 of about 5100 pixels are arrayed with 600 dpi (dot per inch) of resolution.

Next, a conduction structure of the first and second flow-reading glasses 152 and 202 will be described in detail with reference to FIG. 4.

That is, as illustrated in FIG. 4, a conductive coating treatment (ITO (Indium Tin Oxide) treatment) is applied to the surface of the first flow-reading glass 152, and a surface resistivity thereof is set at 200 to 500 [Ω/cm] for example. An aluminum sheet 154, i.e., a conductive member, is pasted integrally through a double-sided tape 155 around an upstream edge in the document conveyance direction (arrow F) of the first flow-reading glass 152 from the surface (upper surface) 152a to a back surface (lower surface) 152b of the first flow-reading glass 152.

The aluminum sheet 154 is electrically conductive with the surface of the first flow-reading glass 152. The aluminum sheet 154 is also connected with a casing 156 (see FIG. 3) having conductivity such as a sheet metal for example of the image reading apparatus 103. The casing 156 is electrically connected with the apparatus body 101A (FIG. 1) to electrically conduct the whole apparatus. Thus, the first flow-reading glass 152 is grounded (frame ground) in a manner of applying the conductive coating treatment on the surface thereof.

A conductive coating treatment (ITO treatment) is applied also to the surface of the second flow-reading glass 202, and a surface resistivity thereof is set at 200 to 500 [Ω/cm] for example. An aluminum sheet 204 is pasted integrally through a double-sided tape 205 around an upstream edge of the second flow-reading glass 202 in the same manner with the first flow-reading glass 152. Still further, the second flow-reading glass 202 is electrically connected with the apparatus body 101A (FIG. 1) in the same manner with the first flow-reading glass 152 by a conductive member not illustrated to conduct the whole apparatus. Thus, the second flow-reading glass 202 is grounded (frame ground) in a manner of applying the conductive coating treatment on the surface thereof.

Still further, as illustrated in FIG. 4, the upstream conveyance guide 400 includes, sequentially from upstream, an upstream inclined guide surface 401, a parallel guide surface 402, a downstream guide surface 403, and a downstream inclined guide surface 404. When the document D is conveyed by the conveyance roller pair 8 (FIG. 3) by the document feeding operation described above, the document D passes through a gap between the upstream inclined guide surface 401 of the upstream conveyance guide 400 coupled with the second flow-reading glass 202 and a surface 152a of the first flow-reading glass 152. The document D also passes through a gap between the parallel guide surface 402 of the upstream conveyance guide 400 formed approximately in parallel with the first flow-reading glass 152 and the surface 152a. It is noted that the parallel guide surface 402 includes first and second edge corners A and B facing the first flow-reading glass 152 and positioned respectively upstream and downstream of the first image reading position R1 (see FIGS. 8A, 8B, 8C, and 9).

Still further, the downstream conveyance guide 500 includes, in order from upstream, an upstream inclined guide surface 501, a parallel guide surface 502, and a downstream guide surface 503. When the document D is conveyed from the first flow-reading glass 152 side, the document D passes through a gap between the upstream inclined guide surface 501 of the downstream conveyance guide 500 and the downstream guide surface 403. Still further, the document D passes through a gap between the parallel guide surface 502 formed approximately in parallel with the second flow-reading glass 202 and a surface 202a of the second flow-reading glass 202 and a gap between the downstream inclined guide surface 404 and the downstream guide surface 503.

First Comparative Example

Here, a first comparative example including a configuration for scraping foreign matters adhering on the surface of the flow-reading glass will be described along FIGS. 17A, 17B, 17C, and 17D. FIG. 17A is a diagram illustrating a configuration of an image reading portion in the first comparative example, FIG. 17B is a diagram illustrating a state in which a document enters the image reading portion, FIG. 17C is a diagram illustrating a state in which the leading edge of the document is located at a document reading position of a first image reading portion, and FIG. 17D is a diagram illustrating a state in which the leading edge of the document has scraped a foreign matter.

That is, as illustrated in FIGS. 17A, 17B, 17C, and 17D, a first image reading portion 602 on the scanner side and a second image reading portion 702 on the ADF side, simultaneously reading both surfaces of the document D, are disposed to face with each other in the first comparative example. Then, the first comparative example has a configuration of reading the images while passing the document D through a conveyance path formed by the first and second flow-reading glasses 601 and 701.

According to this configuration, in reading the images of the both surfaces of the document D conveyed as illustrated in FIG. 17A, the document D is conveyed while frictionally sliding with the first flow-reading glass 601 on the first image reading portion side. As a result, a foreign matter Go generated in a process in which the first surface D1 is in contact with the first flow-reading glass 601 stays on the first flow-reading glass 601. If the foreign matter Go stays at the document reading position at this time in particular, a streaky image is generated in forming an image.

That is, the foreign matter Go carried together with the document D is frictionally slid by the document D and the first flow-reading glass 601. While the document D is conveyed along a conveyance guide not illustrated by passing through the first flow-reading glass 601, the foreign matter Go is electrostatically adsorbed by and stays at the first flow-reading glass 601. If the foreign matter Go happens to stay at the document reading position at this time, a streaky image is generated because the document D is read continuously by the first image reading portion 602 or the second image reading portion 702. The conductive coating is applied to the surface of the first flow-reading glass 601 to reduce a potential difference between the first flow-reading glass 601 and the document D and to prevent electrification caused by the conveyance of the document. This arrangement makes it possible to prevent the foreign matter Go from adhering on the first flow-reading glass 601. As a result, even if the foreign matter Go adheres on the first flow-reading glass 601, it becomes possible to scrape the foreign matter Go on the first flow-reading glass 601 in a process in which a leading edge of a succeeding document D comes in contact with the first flow-reading glass 601 as illustrated in FIGS. 17A, 17B, 17C, and 17D.

In the process of reading the image, an upstream feed roller pair Ro1 is arranged to convey the document D such that a leading edge of the document D comes into contact with the first flow-reading glass 601. Then, the document D is nipped and conveyed by a downstream feed roller pair Ro2. The document D being nipped by the upstream and downstream feed roller pairs Ro1 and Ro2 is conveyed while being supported by part of guide members not illustrated formed integrally with ends of the first flow-reading glass 601 or the first flow-reading glass 601. Due to that, the first surface D1 of the document D separates from the first flow-reading glass 601 any longer. Because the first surface D1 of the document D does not come into contact with the first flow-reading glass 601, no foreign matter Go does not adhere on the first flow-reading glass 601 in particular. However, during the process of conveying the document D, there is a case when the foreign matter Go adhering on the second surface D2 incidentally adheres on the back surface (under surface) of the second flow-reading glass 701 due to electrification of the first flow-reading glass 601 or to a jump of the document D during the conveyance. Here, the leading edge of the document D does not come into contact with the second flow-reading glass 701. It is because a conveyance lotus of the document D does not come into contact with the second flow-reading glass 701 since a conveyance direction of the document D of the feed roller pair Ro2 orients upward while a conveyance direction of the document D of the feed roller pair Ro1 orients downward. Therefore, the foreign matter Go adhering on the back surface (under surface) of the second flow-reading glass 701 will not be scraped by the leading edge of the document D. Accordingly, in a case when the foreign matter Go adheres incidentally on the reading position of the second flow-reading glass 701, a streaky image is generated. Thus, the user is required to take a burden of a cumbersome work of frequently cleaning the second flow-reading glass 701.

Scraping Operation of Present Embodiment

Next, a foreign matter scraping operation during a document reading operation of the present embodiment capable of eliminating the abovementioned problem will be described by exemplifying a first comparative example.

That is, as illustrated in FIG. 4, the leading edge of the document conveyed by the conveyance roller pair 8 and others is guided by the upstream inclined guide surface 401 of the upstream conveyance guide 400 and comes into contact with the first flow-reading glass 152 upstream in the document conveyance direction (in the direction indicated by the arrow F) of the first image reading position R1 of the first image reading portion 151. The leading edge of this document D is guided by the downstream conveyance guide 500 disposed adjacent the first flow-reading glass 152. Still further, by being guided by the upstream inclined guide surface 501, the leading edge of the document D slides frictionally the surface 202a of the second flow-reading glass 202. The upstream inclined guide surface 501 is laid out in advance such that a position of contact of the leading edge with the surface 202a at this time becomes upstream in the document conveyance direction of the second image reading position R2 of the second image reading portion 201. An angle θ1 of the upstream inclined guide surface 501 formed with the first flow-reading glass 152 in the document conveyance direction is preferable to be within a range of 5° to 55°, and the angle θ1 is set at 8.5° for example in the configuration of the present embodiment.

Here, the contact range of the leading edge of the document D with the first and second flow-reading glasses 152 and 202 will be described with reference to FIGS. 6A and 6B.

Figure 6A:
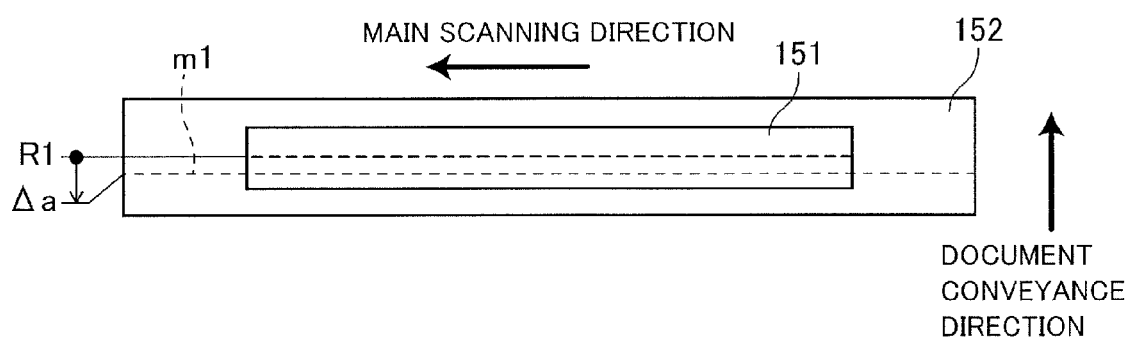
FIG. 6A is a diagram illustrating a document contact range on a first flow-reading glass of the first embodiment.

FIG. 6A is a diagram illustrating a contact position m1 of a leading edge of a document D at the first image reading position R1 of the first flow-reading glass 152. The document D is guided to the first flow-reading glass 152 along a curved guide surface 157a (see FIG. 3) of the conveyance guide 157 disposed in a vicinity of the conveyance roller pair 8, and the leading edge thereof comes into contact with the first flow-reading glass 152 upstream in the document conveyance direction (the direction of the arrow F) by a distance Δa of the first image reading position R1.

Thus, a second extension line Q (see FIG. 4) straightly extending in an inclination direction of the upstream inclined guide surface 401, i.e., the second inclined guide surface, intersects with the first flow-reading glass 152 upstream in the document conveyance direction of the first image reading position R1 of the first image reading portion 151. This arrangement makes it possible to adequately clean the surface corresponding to the first image reading position R1 of the first flow-reading glass 152 prior to reading of the image of the first surface D1 of the document D by the first image reading portion 151.

Figure 6B:
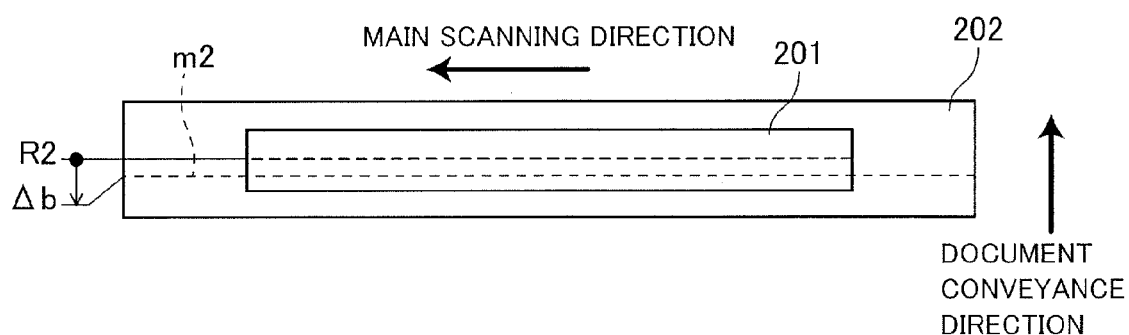
FIG. 6B is a diagram illustrating a document contact range on a second flow-reading glass of the first embodiment.

FIG. 6B is a diagram illustrating an abutment position m2 of the leading edge of the document D at the second image reading position R2 of the second flow-reading glass 202. The document D is guided by the upstream inclined guide surface 501 (see FIG. 4) of the downstream conveyance guide 500, and the leading edge thereof comes into contact with the second flow-reading glass 202 upstream in the document conveyance direction (the direction of the arrow F) by a distance Δb of the second image reading position R2. In the present embodiment, the distance Δa is set at 5 (mm) and the distance Δb is set at 3.5 (mm) for example.

Thus, a first extension line J (see FIG. 4) straightly extending in an inclination direction of the upstream inclined guide surface 501, i.e., the first inclined guide surface, intersects with the second flow-reading glass 202 upstream in the document conveyance direction of the second image reading position R2 of the second image reading portion 201. This arrangement makes it possible to adequately clean the surface corresponding to the second image reading position R2 of the second flow-reading glass 202 prior to reading of the image of the second surface D2 of the document D by the second image reading portion 201.

Figure 7A:
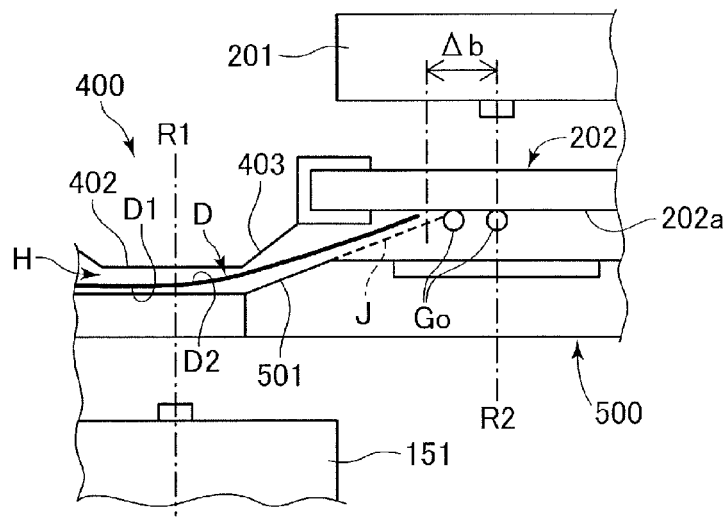
FIG. 7A is a diagram illustrating a state in which a document is in contact with the second flow-reading glass.
Figure 7B:
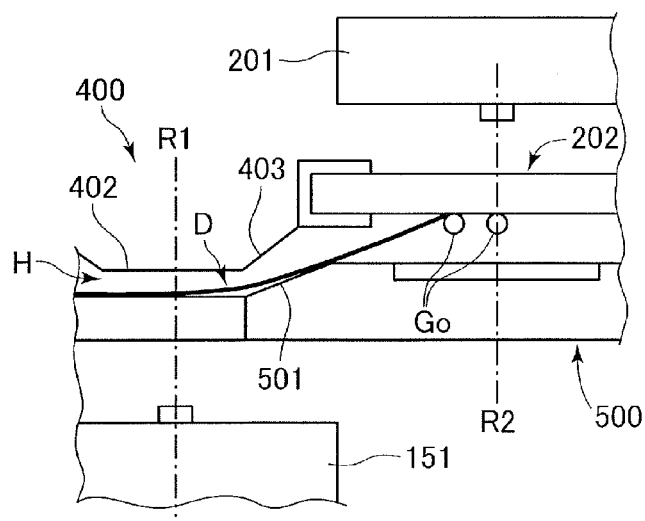
FIG. 7B is a diagram illustrating a state in which a foreign matter on the second flow-reading glass is scraped by the document.
Figure 7C:
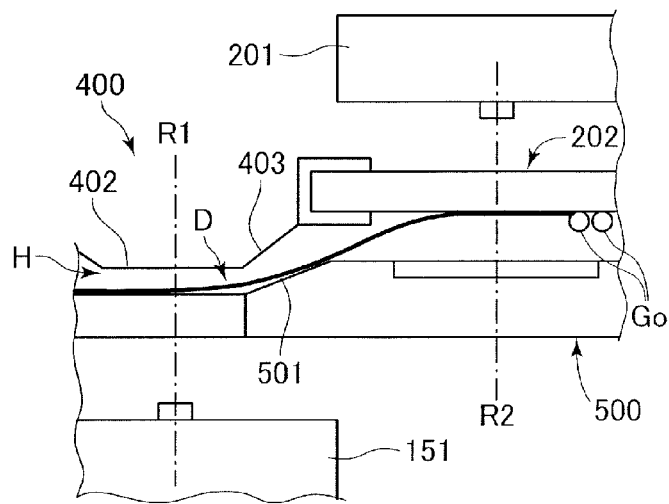
FIG. 7C is a diagram illustrating a state in which the foreign matter on the second flow-reading glass is removed by the document.

Next the operation of scraping the foreign matter Go adhering at the second image reading position R2 of the surface 202a of the second flow-reading glass 202 by the leading edge of the document D being guided by the upstream inclined guide surface 501 and coming into contact with the second flow-reading glass 202 will be descried with reference to FIGS. 7A, 7B, and 7C. It is noted that FIG. 7A is a diagram illustrating a state in which the document is in contact with the second flow-reading glass, FIG. 7B is a diagram illustrating a state in which a foreign matter on the second flow-reading glass is scraped by the document, and FIG. 7C is a diagram illustrating a state in which the foreign matter on the second flow-reading glass is removed by the document.

The leading edge of the document D having being guided by the upstream inclined guide surface 501 comes into contact with the surface 202a upstream in the document conveyance direction of the foreign matter Go adhering at the second image reading position R2 of the second flow-reading glass 202. The leading edge of the document D is then conveyed along the second flow-reading glass 202 as it is and scrapes the foreign matter Go (see FIGS. 7A and 7B). The document D which has scraped the foreign matter Go by the leading edge thereof is conveyed while frictionally sliding along the surface 202a of the second flow-reading glass 202 as it is, so that the foreign matter Go that has been located at the second image reading position R2 on the surface 202a of the second flow-reading glass 202 is removed from the second image reading position R2 (see FIG. 7C).

Figure 8A:
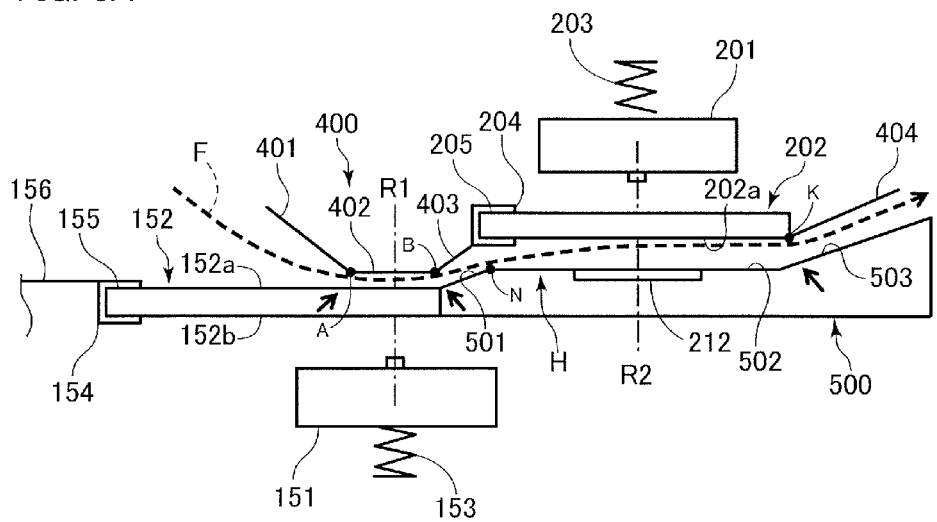
FIG. 8A is a diagram illustrating a restricting position in conveying a document.
Figure 8B:
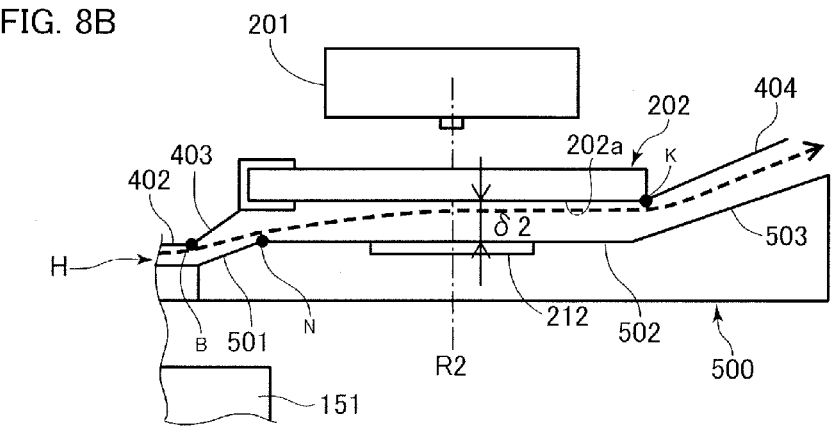
FIG. 8B is an enlarged view illustrating a second image reading portion and its vicinity while the conveyance of the document in FIG. 8A.
Figure 8C:
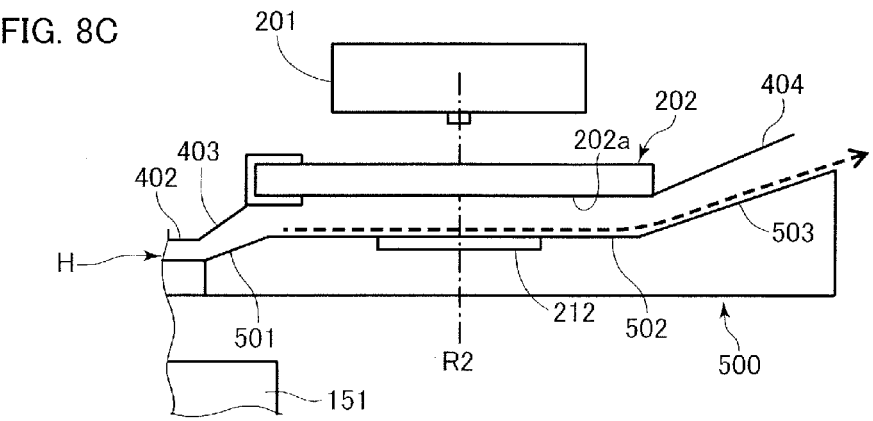
FIG. 8C is a diagram illustrating an attitude of the document when a trailing edge of the document passes through a nip portion of a conveyance roller pair.

Next, a behavior of the document will be described with reference to FIGS. 8A, 8B, and 8C. It is noted that FIG. 8A is a diagram illustrating a restricting position in conveying the document, FIG. 8B is an enlarged view illustrating the second image reading portion 201 and its vicinity while conveying the document as illustrated in FIG. 8A, and FIG. 8C is a diagram illustrating an attitude of the document when a trailing edge of the document passes through a nip portion of the conveyance roller pair 8. It is noted that the restricting position indicates a conveyance locus of the document D being nipped and conveyed by the conveyance roller pairs 8 and 9.

As described above, the document D is nipped and conveyed by the conveyance roller pair 8, i.e., a first conveyance rotator pair, and the conveyance roller pair 9, i.e., a second conveyance rotator pair (see FIG. 3). The conveyance roller pair 8 is disposed upstream in the document conveyance direction (in the direction of the arrow F) along the document conveyance path H and conveys the document D to the first image reading portion 151. The conveyance roller pair 9 is disposed downstream in the document conveyance direction along the document conveyance path H and conveys the document D that has passed through the first and second image reading portions 151 and 201. The conveyance roller pair 8 conveys the document D in an obliquely downward direction and the conveyance roller pair 9 conveys the document D in an obliquely upward direction. That is, the conveyance direction of the document D of the conveyance roller pair 8 contains a vertically downward component, and the conveyance direction of the document D of the conveyance roller pair 9 contains a vertically upward direction. This configuration smoothes and stabilizes the conveyance of the document D.

Where a sheet conveyance velocity of the conveyance roller pair 8 is denoted as V1 and a sheet conveyance velocity of the conveyance roller pair 9 is denoted as V2, the sheet conveyance velocities are set such a relationship of $V1 \leq V2$ is met in the present embodiment. This setting is made based on the control of the driving motor Mo (see FIG. 3) made by the control portion 132 and on setting and others of gear ratio of a transmission mechanism not illustrated transmitting the drive of the driving motor Mo so as to respectively rotate the conveyance roller pairs 8 and 9. This setting is applied also in second and third embodiments described later.

The document is drawn nearer to the upstream conveyance guide 400 and the second flow-reading glass 202 in the direction of the arrow F in FIG. 8A by thus setting the sheet conveyance velocity V2 of the conveyance roller pair 9 and the sheet conveyance velocity V1 of the conveyance roller pair 8 so as to meet the relationship of $V1 \leq V2$. The document is conveyed while being in contact with a first edge corner A formed between the parallel guide surface 402 and the upstream inclined guide surface 401, a second edge corner B formed between the parallel guide surface 402 and the downstream guide surface 403, and a third edge corner K formed between the second flow-reading glass 202 and the downstream inclined guide surface 404. It is noted that the upstream conveyance guide 400 is formed such that the downstream inclined guide surface 404 projects downstream of the second flow-reading glass 202 while avoiding the second flow-reading glass 202 in the front-back direction of FIG. 8A.

Here, the second edge corner B is located vertically below a fourth edge corner N formed between the upstream inclined guide surface 501 of the downstream conveyance guide 500 and the parallel guide surface 502. Therefore, the back surface of the document D conveyed while being supported by the first edge corner A, the second edge corner B, and the third edge corner K during reading is conveyed while separating from the surface 202a of the second flow-reading glass 202 (see FIG. 8B).

Because the leading edge of the document D comes into contact with the surface 202a of the second flow-reading glass 202 during when the document D is conveyed only by the conveyance roller pair 8 as described above, it is possible to scrape the foreign matter Go incidentally adhering at the second image reading position R2. Still further, because the second surface D2 of the document D does not come into contact with the surface 202a in the process in which the document D is conveyed by the conveyance roller pairs 8 and 9, no foreign matter Go adhering on the second surface D2 will adhere on the second flow-reading glass 202.

By the way, either one of the first and second image reading portions 151 and 201 in the present embodiment is composed of CIS. A focal depth of CIS is shallow in general and is around 0.3 mm to 0.4 mm. Accordingly, if the document D is separated from a focal position at the first and second image reading positions R1 and R2 during the conveyance of the document D, the image being read is defocused (an image of out of focus).

A focal position of the first image reading portion 151 is a sheet passing surface (the surface 152a) of the first flow-reading glass 152 at the first image reading position R1. At this time, because the leading edge of the document D is in contact with the surface 152a when the document D is conveyed along the first flow-reading glass 152 as described above, a height of information of the document D coincides with the focal position. However, because the leading edge of the document D is lifted upward when the leading edge comes to the upstream inclined guide surface 501 of the downstream conveyance guide 500, the document D floats up at the first image reading position R1.

Figure 9:
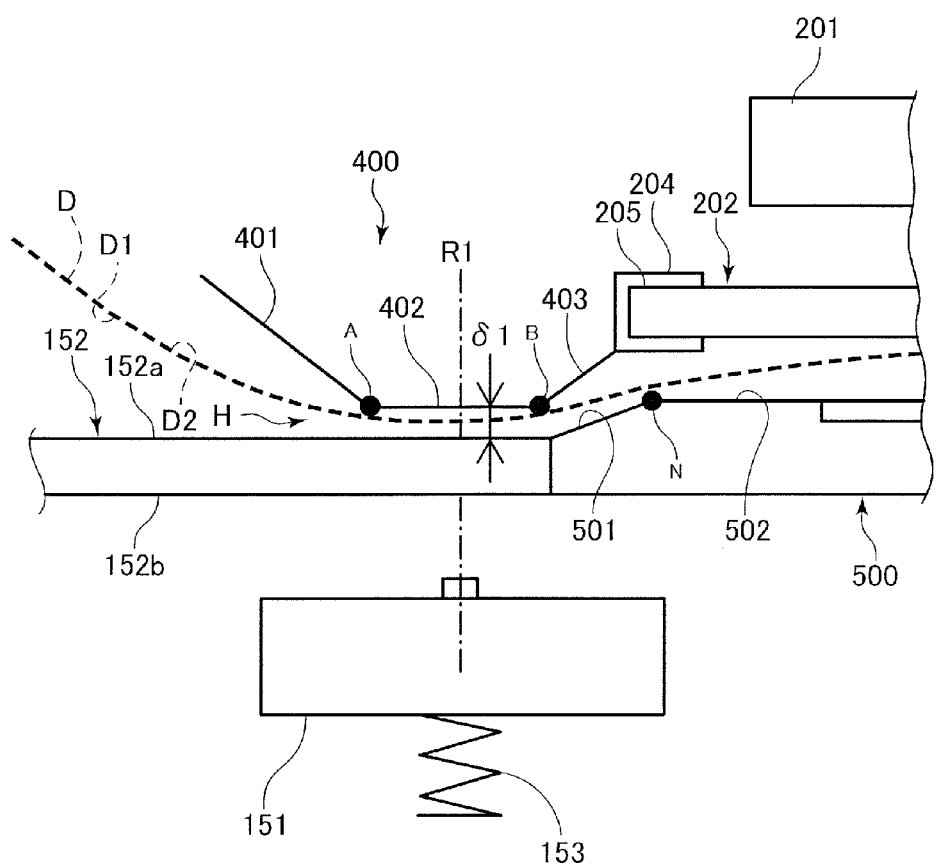
FIG. 9 is an enlarged view illustrating a first image reading portion during the conveyance of the document of the first embodiment.

Still further, because the document D moves while being in contact with the first edge corner A, the second edge corner B, and the third edge corner K as described above when the document D is conveyed by the conveyance roller pairs 8 and 9, the document D floats upward from the focal position at the first image reading position R1 as illustrated in FIG. 9. At this time, it is possible to regulate the document D from moving up and down within a conveyance path formed between the upstream conveyance guide 400 and the surface 152a of the first flow-reading glass 152 by appropriately setting a distance between the parallel guide surface 402 of the upstream conveyance guide 400 and the first flow-reading glass 152. As a result, the document D is stably conveyed within a range of an allowable distance δ1 of the focal depth of the first image reading portion 151. In the present embodiment, the distance between the parallel guide surface 402 of the upstream conveyance guide 400 and the first flow-reading glass 152 is set at 0.6 mm for example.

The document D is conveyed while being in contact with the second edge corner B and the third edge corner K in the same manner also when the image is read while being conveyed by the conveyance roller pairs 8 and 9 at the second image reading position R2 as illustrated in FIG. 8B. As a result, the focal position of the document D at the second image reading position R2 is assured within a range of an allowable distance δ2 from a sheet passing surface (the surface 202a) of the second flow-reading glass 202. In the present embodiment, a distance between the parallel guide surface 502 of the downstream conveyance guide 500 and the surface 202a of the second flow-reading glass 202 is set at 0.4 mm for example such that the document D is conveyed within the allowable distance of the focal depth of the second image reading portion 201. Here, when the document D is conveyed further as illustrated in FIG. 8C, the trailing edge of the document D separates from the conveyance roller pair 8 and the document D is conveyed from the parallel guide surface 502 along the downstream guide surface 503 of the downstream conveyance guide 500. At this time, the parallel guide surface 502 and the downstream guide surface 503 are cleaned by the trailing edge of the document D.

It is also possible to prevent the document D from separating from the allowable focal positions at the first and second image reading positions R1 and R2 by the conveyance roller pairs 8 and 9 pulling the document D from each other due to the parallel guide surface 402 of the upstream conveyance guide 400.

Figure 15A:
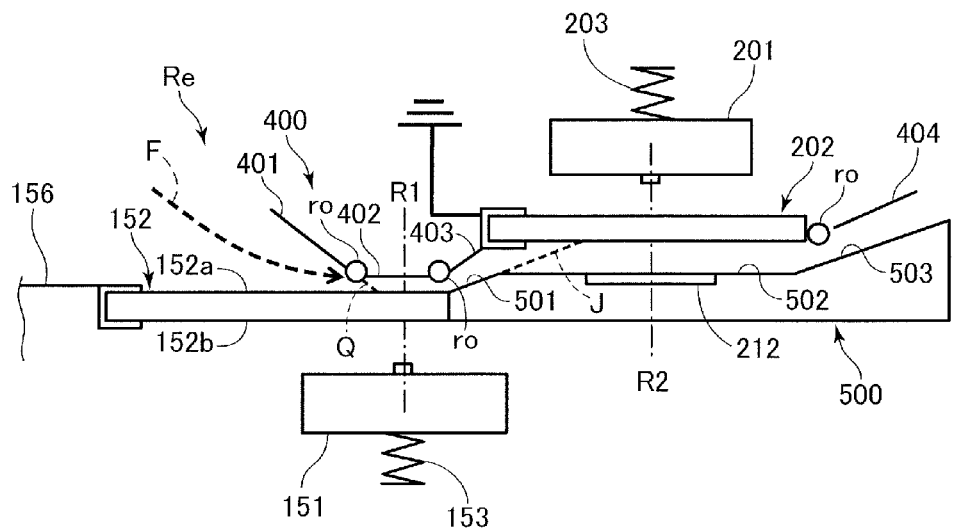
FIG. 15A is an enlarged view illustrating an image reading portion of a fourth embodiment.
Figure 15B:
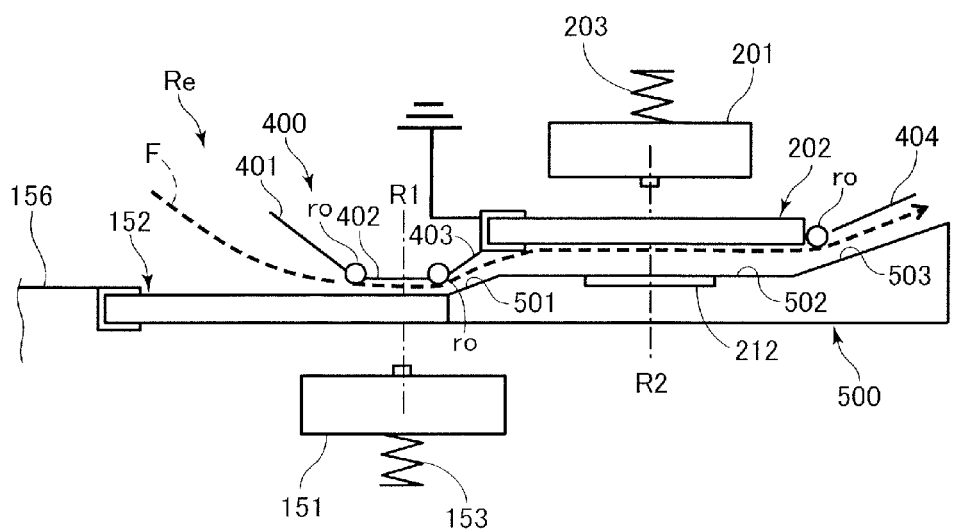
FIG. 15B is a diagram illustrating a restricting position in conveying a document in the image reading portion of the fourth embodiment.

It is also possible to provide a driven roller ro, i.e., a fourth driven rotator, that is driven while being in contact with the document D similarly to a driven roller ro illustrated in FIGS. 15A and 15B at a fourth edge corner N provided at a position higher than the second edge corner B at an upstream end in the document conveyance direction of the parallel guide surface 502. This arrangement makes it possible to further smooth the conveyance situation of the document D.

Thus, the present embodiment described above makes it possible to scrape and to remove the foreign matters adhering on the first and second flow-reading glasses 152 and 202 with the simple configuration by one time of feed by the image reading apparatus 103 capable of reading images of the both surfaces of the document by the first and second image reading portions 151 and 201. Therefore, it is possible to prevent a streaky image from being generated and to realize a stable conveyance of the document D.

Second Embodiment

Figure 10:
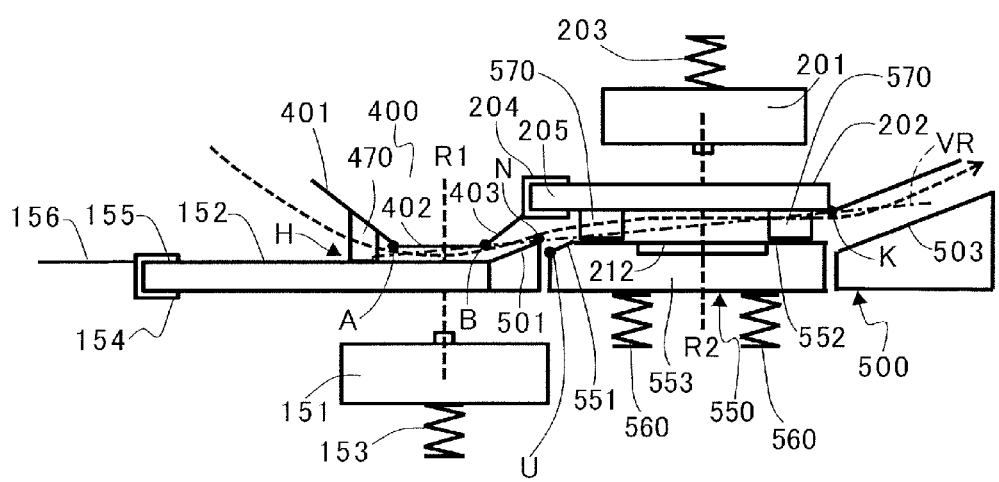
FIG. 10 is an enlarged view illustrating an image reading portion of a second embodiment.
Figure 11:
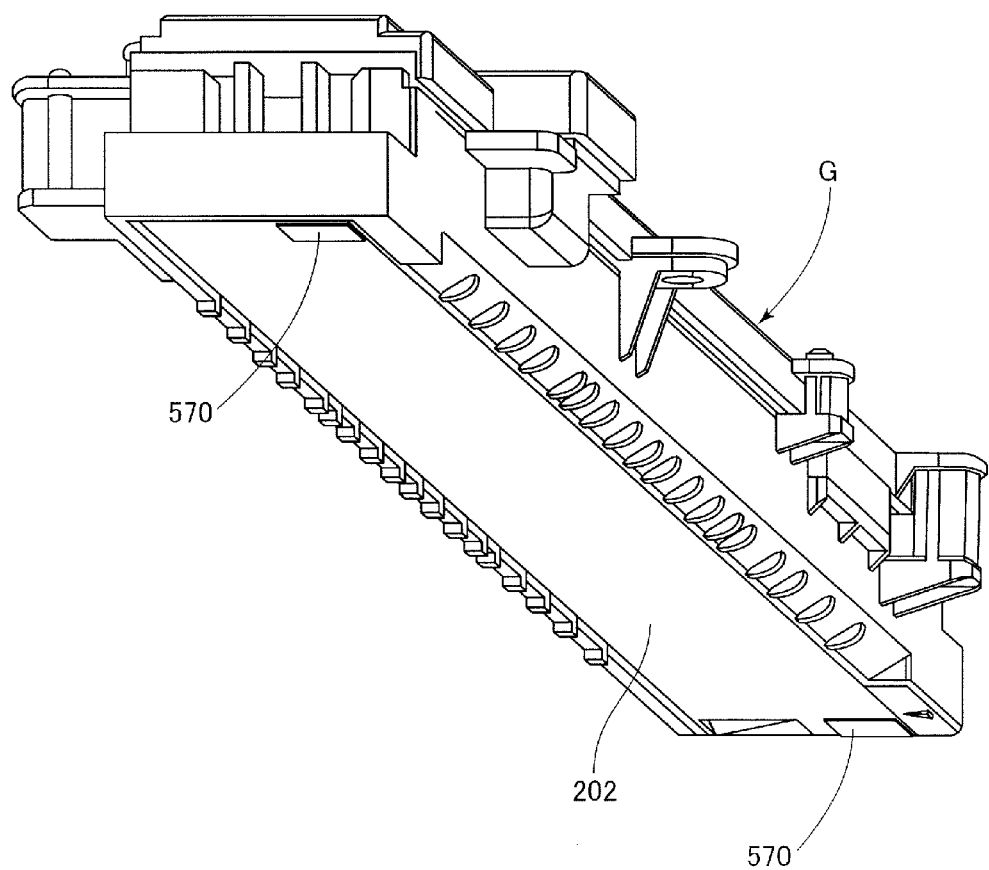
FIG. 11 is a perspective view illustrating a sealed guide and a second flow-reading glass of the second embodiment.
Figure 12:
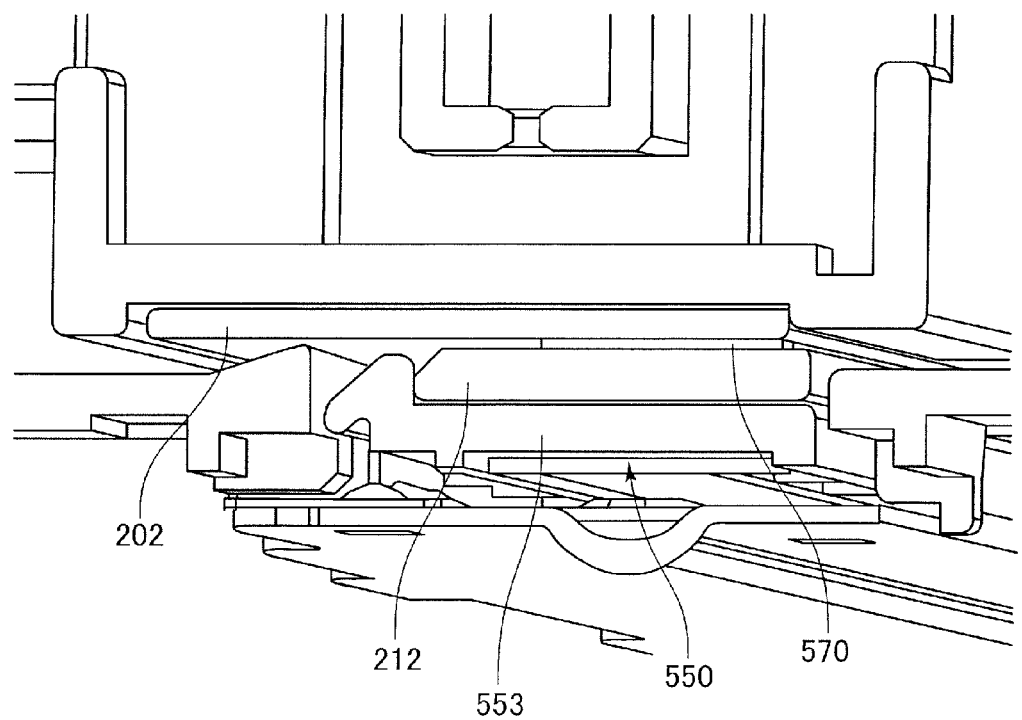
FIG. 12 is a partially sectional enlarged perspective view illustrating a moving guide unit and a second flow-reading glass of the second embodiment.

Next, an image reading apparatus of a second embodiment will be described with reference to FIGS. 10 through 12. FIG. 10 is an enlarged view illustrating the image reading portion of the second embodiment, FIG. 11 is a perspective view illustrating a sealed guide and a second flow-reading glass of the second embodiment, and FIG. 12 is a partially sectional enlarged perspective view illustrating a moving guide unit and the second flow-reading glass of the second embodiment.

While the present embodiment is different from the first embodiment in that a moving guide unit 550 movable toward the second flow-reading glass 202 is disposed in the downstream conveyance guide 500, the other configuration is the same. It is noted that the same or corresponding members of the present embodiment with those of the first embodiment will be denoted with the same reference numerals, and descriptions of those having the same configurations and functions will be omitted here.

The CIS for example is used as an image sensor reading a document in the first and second image reading portions 151 and 201 as described above, so that the range of the distance which causes no defocusing based on a focal distance thereof is narrow. Therefore, it is preferable to accurately control a distance between the first and second flow-reading glasses 152 and 202 and members opposing to them to pass the document within the abovementioned range of the distance from the first and second flow-reading glasses 152 and 202. However, the first flow-reading glass 152 and the downstream conveyance guide 500 are provided in the scanner unit 30 fixed to the apparatus body 101A, and the second flow-reading glass 202 and the upstream conveyance guide 400 are provided in the ADF 1. That is, when the ADF 1 is closed with respect to the scanner unit 30, the respective members are required to be positioned with a high degree of accuracy. However, due to tolerance and others of various components, it is difficult to position the both gaps (distances) between the first flow-reading glass 152 and the upstream conveyance guide 400 and between the second flow-reading glass 202 and the downstream conveyance guide 500 with a high degree of accuracy. Therefore, according to the second embodiment, the gap between the first flow-reading glass 152 and the upstream conveyance guide 400 is assured at first and upon that, the gap facing the second flow-reading glass 202 is assured by using the moving guide unit 550. The image reading apparatus of the second embodiment will be described in detail below.

As illustrated in FIG. 10, the upstream conveyance guide 400 includes a first gap forming member 470 fixed at a position facing the first flow-reading glass 152 and outside of the document conveyance path H in a direction intersecting with the sheet conveyance direction. That is, the first gap forming member 470 is disposed at a position not interfering with the document being conveyed through the document conveyance path H. Then, the first gap forming member 470 abuts with the first flow-reading glass 152 when the ADF 1 is closed with respect to the scanner unit 30 and brings about the gap through which the document can pass between the first flow-reading glass 152 and the upstream conveyance guide 400. It is noted that while a plurality of gap forming members 470 may be provided on both sides across the document conveyance path H, but only one gap forming member may be also provided on one side of the document conveyance path H. Still further, while the first gap forming member 470 fixed to the upstream inclined guide surface 401 is illustrated in FIG. 10, the first gap forming member 470 may be fixed to the parallel guide surface 402. That is, the first gap forming member 470 may be disposed at any position as long as the first gap forming member 470 is abuttable with the first flow-reading glass 152.

Meanwhile, as illustrated in FIGS. 10 through 12, second gap forming members 570 are fixed on the second flow-reading glass 202 at plural positions facing the moving guide unit 550, and outside of the document conveyance path H in the direction intersecting with the sheet conveyance direction so as to interpose the document conveyance path H between them. That is, the second gap forming member 570 is disposed at the position outside of the main scan direction of the document conveyance path H, i.e., the position where the second gap forming member 570 does not interfere with the document being conveyed through the document conveyance path H and where the second gap forming member 570 is abuttable with the moving guide unit 550. Then, the second gap forming member 570 abuts with the moving guide unit 550 when the ADF 1 is closed with respect to the scanner unit 30 and brings about a gap through which the document can pass between the second flow-reading glass 202 and the moving guide unit 550. It is noted that the plurality of second gap forming members 570 may be disposed at a plurality of positions of upstream and downstream in the sheet conveyance direction as illustrated in FIG. 10, or the second gap forming member 570 may be disposed at one place in the sheet conveyance direction in a manner having a certain length in the sheet conveyance direction as illustrated in FIGS. 11 and 12. Note that it is preferable to dispose the second gap forming members 570 at least two places of the both sides across the document conveyance path H.

Meanwhile, the moving guide unit 550 as a moving guide portion includes a moving guide body 553, and a parallel guide surface 552 in parallel with the second flow-reading glass 202 while the ADF 1 is closed is formed above the moving guide body 553. A white sheet member 212 is disposed on the moving guide body 553 such that an upper surface of the moving guide body 553 is in flush with the parallel guide surface 552. Still further, an inclined guide surface 551 is formed on the moving guide body 553 upstream in the sheet conveyance direction of the parallel guide surface 552 so as to be inclined upward toward downstream in the sheet conveyance direction.

The moving guide unit 550 is supported by the downstream conveyance guide 500 so as to be movable in the vertical direction, i.e., to be movable toward the second flow-reading glass 202, in a manner in which the moving guide unit 550 is adjacent to the upstream inclined guide surface 501 and is inserted into a hole provided through the downstream conveyance guide 500. A plurality of springs (urging members) 560 are contractively provided between the moving guide unit 550 and a bottom surface not illustrated of the hole of the downstream conveyance guide 500. These springs 560 urge the moving guide unit 550 toward the second flow-reading glass 202. It is noted that the moving guide unit 550 is urged upward by the springs 560. At this time, an upward moving range of the moving guide unit 550 is limited by a stopper not illustrated. That is, the moving guide unit 550 is restricted by the stopper such that a fifth edge corner U, an upstream edge corner of the inclined guide surface 551, steadily assumes a position lower (not to be higher) than a fourth edge corner N, i.e., a downstream edge corner of the upstream inclined guide surface 501. Thus, the fifth edge corner U of the inclined guide surface 551 is disposed at a position distant from the second flow-reading glass 202 more than the fourth edge corner N of the upstream inclined guide surface 501. It is noted that while the moving guide unit 550 is restricted from moving upward by the stopper, the moving guide unit 550 is configured to have a movable range larger than an amount of errors generated from tolerances of the respective components described later.

In the image reading apparatus of the second embodiment constructed as described above, the first gap forming member 470 abuts with the first flow-reading glass 152 in the state in which the ADF 1 is closed. Thereby, the distance in the document conveyance path H between the first flow-reading glass 152 and the parallel guide surface 402 is controlled, and the gap of this part is made constant and is approximately paralleled by regulating a level of the first gap forming member 470. At this time, the tolerances of the respective components from the upstream conveyance guide 400 to the second flow-reading glass 202 and the tolerances of the respective components from the first flow-reading glass 152 to the downstream conveyance guide 500 are accumulated, and there is a possibility that an error is generated in the gap at the second image reading position R2 with a structure including no moving guide unit 550 for example.

However, the plurality of second gap forming members 570 abut with the moving guide unit 550 and the distance of the moving guide unit 550 to the second flow-reading glass 202 is regulated by the level of the plurality of second gap forming members 570. At this time, there is a possibility of assuming such positional relationship that the second flow-reading glass 202 and the downstream conveyance guide 500 are inclined with respect to a direction of a surface intersecting with the sheet conveyance direction, i.e., a surface direction including the main scan direction of the second image reading portion 201. However, the moving guide unit 550 is rockably urged in the surface direction including the main scan direction by the plurality of springs 560, and the moving guide unit 550 moves and follows rockably. In other words, the springs 560 rockably supports the moving guide unit 550 such that edges, in the direction intersecting with the sheet conveyance direction, of the moving guide portion are able to rock vertically. To that end, the gap of this part is uniformed and the parallel guide surface 552 and the white sheet member 212 are paralleled with the second flow-reading glass 202. That is, it is possible to absorb the error generated by the accumulation of the tolerances of the respective components and to assure the gap formed in the document conveyance path H of the part of the second flow-reading glass 202 to be constant and to be parallelized by moving the moving guide unit 550 following the second flow-reading glass 202. This arrangement makes it possible to maintain the constant distance between the document being conveyed and the second flow-reading glass 202 and to read the image stably by the second image reading portion 201.

Still further, because the position of the fifth edge corner U of the inclined guide surface 551 is regulated to be lower than that of the fourth edge corner N of the upstream inclined guide surface 501, it is possible to prevent the leading edge of the document conveyed to the fourth edge corner N comes into contact with the moving guide unit 550, thus otherwise generating an impact or a sudden change of conveying resistance. This arrangement makes it possible to convey the document stably, to prevent such a problem of generating a shift in a read image, and to read the image stably by the second image reading portion 201.

Still further, because the conveying speed of the conveyance roller pair 9 located downstream in the sheet conveyance direction is made faster than that of the conveyance roller pair 8 located upstream also in the second embodiment, the document is tightened and comes into contact closely with the third edge corner K when the leading edge of the document arrives at the conveyance roller pair 9. At this time, the fourth edge corner N is located between the second edge corner B and the third edge corner K as illustrated in FIG. 10 in the image reading apparatus of the present embodiment. That is, the document is pulled so as to come into contact closely with the second edge corner B, the fourth edge corner N, and the third edge corner K. That is, if the fourth edge corner N is located at a position lower than the imaginary line VR connecting the second edge corner B with the third edge corner K, the document comes into contact tightly with the second edge corner B and the third edge corner K and is conveyed on the imaginary line VR. However, because the fourth edge corner N is located at the position higher than the imaginary line VR in the present embodiment, the document comes into contact tightly with the fourth and third edge corners N and K and is conveyed while being closer to be in parallel with the second flow-reading glass 202 than the imaginary line VR. That is, it is possible to enhance document reading accuracy.

Still further, if the document is tried to be supported by the inclined guide surface 551 of the moving guide unit 550 and the third edge corner K for example, the moving guide unit 550 is pressed downward by tension of the document, and the document is conveyed on the imaginary line VR by the second edge corner B and the third edge corner K. Or, there is a possibility that the document being conveyed is rocked up and down by the urging force of the springs 560, thus deteriorating the reading precision. However, because the fourth edge corner N is formed on the downstream conveyance guide 500 and is fixed without moving like the moving guide unit 550, the fourth edge corner N is not moved downward by the tension of the document. Therefore, it is possible to bring the document closer to be in parallel with the second flow-reading glass 202 more than the imaginary line VR and to convey the document stably. That is, it is possible to enhance document reading accuracy.

It is noted that if there is no upstream inclined guide surface 501, there is no fourth edge corner N and the document is conveyed on the imaginary line VR while being in close contact with the second edge corner B and the third edge corner K. However, if there is no upstream inclined guide surface 501, it is unable to direct the leading edge of the document to the second flow-reading glass 202 and is unable to scrape the foreign matter as described above. Accordingly, it is possible to scrape the foreign matter on the second flow-reading glass 202 and to convey the document while bringing the document closer to be in parallel with the second flow-reading glass 202 after when the document arrives at the conveyance roller pair 9 by providing the upstream inclined guide surface 501 and the fourth edge corner N of the present embodiment.

It is noted that while the image reading portion in which the plurality of gap forming members 570 is provided fixedly on the second flow-reading glass 202 has been described in the second embodiment, the gap forming members 570 may be provided on the moving guide unit 550 in contrary so as to abut with the second flow-reading glass 202 when the ADF 1 is closed. That is, the gap forming members 570 may be composed such that the gap forming members 570 are provided on either one of the second flow-reading glass 202 and the moving guide unit 550 so as to abut with the other one of the second flow-reading glass 202 and the moving guide unit 550.

Still further, similarly to what described above, while the image reading portion in which the first gap forming member 470 is provided fixedly on the upstream conveyance guide 400 has been described above, the first gap forming member 470 may be provided fixedly on the first flow-reading glass 152 so as to abut with the upstream conveyance guide 400 when the ADF 1 is closed. That is, it will do if the first gap forming member 470 is provided at either one of the upstream conveyance guide 400 and the first flow-reading glass 152 so as to abut with the other one of the upstream conveyance guide 400 and the first flow-reading glass 152.

Still further, while the image reading portion including the plurality of springs urging the moving guide unit 550 has been described in the second embodiment, it is also conceivable of rockably urging the moving guide unit 550 while supporting one spot around a center of gravity of the moving guide unit 550.

Third Embodiment

Figure 13:
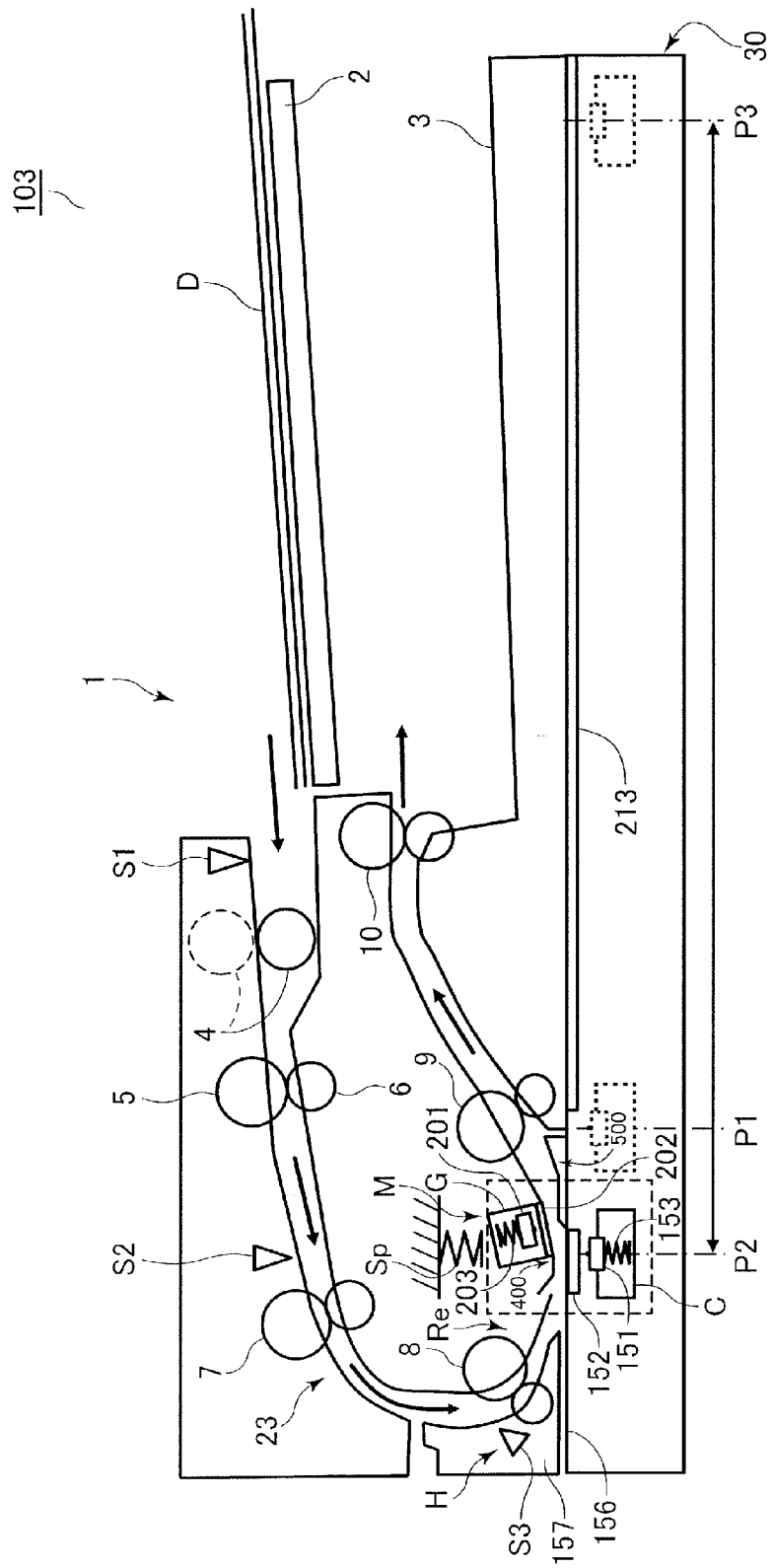
FIG. 13 is a diagram illustrating a configuration of an image reading apparatus of a third embodiment.
Figure 14A:
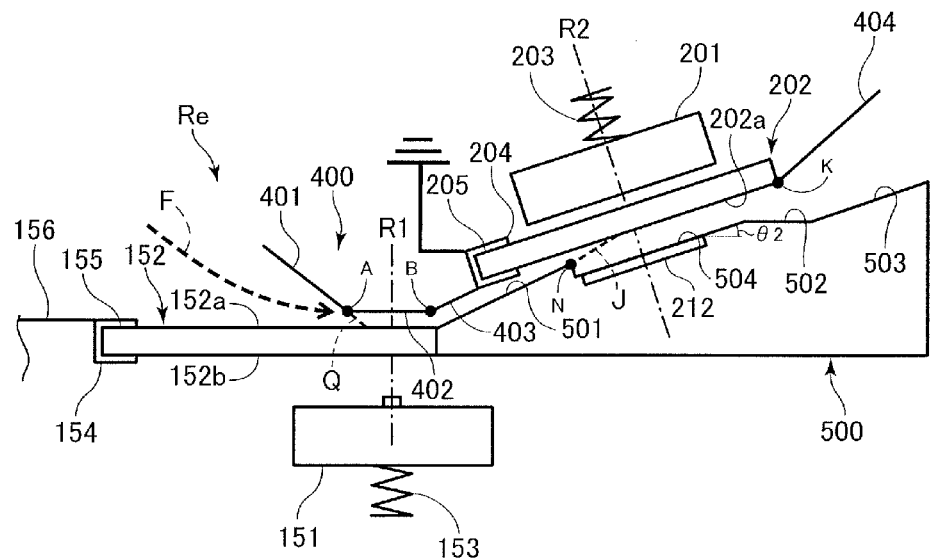
FIG. 14A is an enlarged diagram illustrating an image reading portion of a third embodiment.

An image reading apparatus of a third embodiment will be described with reference to FIGS. 13, 14A, and 14B. FIG. 13 is a diagram illustrating a configuration of the image reading apparatus of the present embodiment. FIG. 14A is an enlarged diagram illustrating an image reading portion of the present embodiment, and FIG. 14B is a diagram illustrating a restricting position in conveying a document in the image reading portion of the present embodiment.

While the present embodiment is different from the first embodiment in that the second image reading portion 201 and the second flow-reading glass 202 are disposed aslant with respect to the first image reading portion 151 and the first flow-reading glass 152, the other configuration is the same. It is noted that the same or corresponding members of the present embodiment with those of the first embodiment will be denoted with the same reference numerals, and descriptions of those having the same configurations and functions will be omitted here.

Figure 14B:
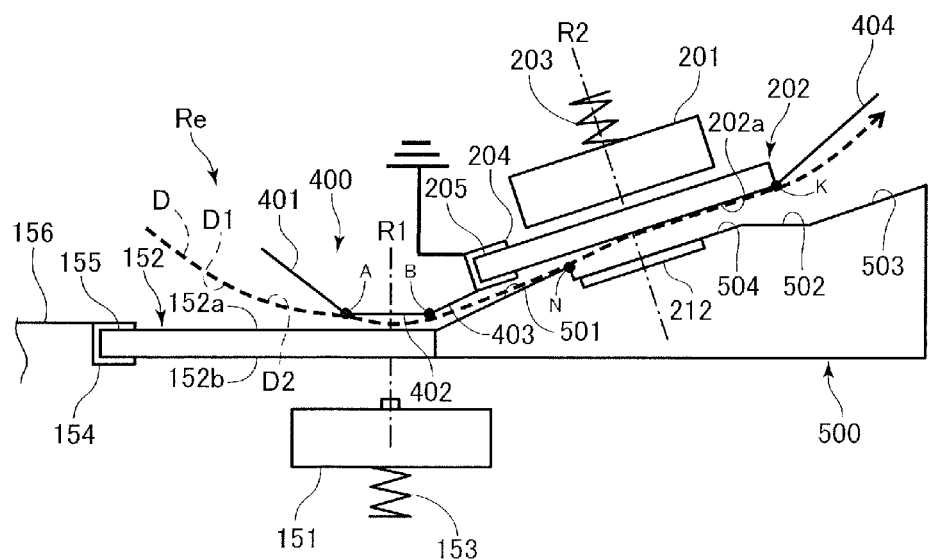
FIG. 14B is a diagram illustrating a restricting position in conveying a document in the image reading portion of the third embodiment.

As illustrated in FIGS. 13, 14A, and 14B, the downstream conveyance guide 500 includes an opposed guide surface 504 facing the surface 202a of the second flow-reading glass 202 with a gap and is continuous from the upstream inclined guide surface (first inclined guide surface) 501. Then, the second image reading portion 201, the second flow-reading glass 202, and the opposed guide surface 504 are inclined with respect to the first flow-reading glass 152 by an angle $\theta2$ so as to rise toward the downstream in the document conveyance direction (in the direction of the arrow F). Still further, the downstream conveyance guide 500 includes the opposed guide surface 504 inclined by the angle θ2 so as to be paralleled with the second flow-reading glass 202. The opposed guide surface 504 includes the fourth edge corner N located at a position vertically higher than that of the second edge corner B in FIG. 14A at a part neighboring the upstream inclined guide surface 501.

It is noted that the second extension line Q extending straightly along the upstream inclined guide surface 401 intersects with the first flow-reading glass 152 upstream in the document conveyance direction of the first image reading position R1 of the first image reading portion 151 also in the present embodiment. Still further, a first extension line J extending straightly along the upstream inclined guide surface 501 intersects with the second flow-reading glass 202 upstream in the document conveyance direction of the second image reading position R2 of the second image reading portion 201. This arrangement makes it possible to adequately clean the surface corresponding to the first image reading position R1 of the first flow-reading glass 152 and the surface corresponding to the second image reading position R2 of the second flow-reading glass 202 prior to reading the images of the first and second surfaces D1 and D2 of the document D.

In the present embodiment described above, the operation for scraping the foreign matter Go adhering on the first and second flow-reading glasses 152 and 202 and the respective focal position of the first and second image reading portions 151 and 201 are the same with the first embodiment. However, the conveyance path at the second image reading portion may be formed approximately into a shape of letter U by inclining the second image reading portion 201 and the second flow-reading glass 202 and by forming the plane facing the second flow-reading glass 202 as a plane in parallel with the second flow-reading glass 202 as the opposed guide surface 504. This arrangement makes it possible to reduce conveyance resistance of the document D receiving from the upstream and downstream conveyance guides 400 and 500 as much as possible.

It is noted that it is possible to provide the first gap forming member 470, the second gap forming member 570, and the moving guide unit 550 of the second embodiment also in the third embodiment. Still further, when the moving guide unit 550 is provided, it is preferable to provide the moving guide unit 550 in a state inclined by the angle θ2 by matching with the angle of the second flow-reading glass 202.

Fourth Embodiment

Next, an image reading apparatus of a fourth embodiment will be described with reference to FIGS. 15A and 15B. FIG. 15A is an enlarged view illustrating an image reading portion of the present embodiment, and FIG. 15B is a diagram illustrating a restricting position in conveying a document in the image reading portion. It is noted that the same members with those of the first embodiment will be denoted by the same reference numerals, and descriptions of those having the same configurations and functions with those of the first embodiment will be omitted here.

As illustrated in FIGS. 15A and 15B, in the present embodiment, driven rollers, i.e., driven rotators, ro driven by a move of the document D being conveyed are disposed respectively at the first edge corner A, the second edge corner B, and the third edge corner K of the upstream conveyance guide 400 described in the first embodiment. A known rotator supporting structure is used to support these driven rollers ro to the upstream conveyance guide 400.

According to the present embodiment, the driven rollers ro driven by being in contact with the document D are provided respectively at the first edge corner A, the second edge corner B, and the third edge corner K located downstream of the second flow-reading glass 202 (see FIG. 14A) which are in slidable contact with the document D being conveyed through the document conveyance path H. That is, the first driven rotator ro driven by being in contact with the document is disposed at a first edge corner A of the second conveyance guide 400 which is located on the upstream end, in the sheet conveyance direction, of the parallel guide surface of the second conveyance guide facing the first transparent member. The second driven rotator ro driven by being in contact with the document is disposed at the second edge corner B of the second conveyance guide which is located on a downstream end of a parallel guide surface. The third driven rotator ro driven by being in contact with the sheet is disposed at a third edge corner K of the second conveyance guide which is located downstream of the second transparent member.

According to the present embodiment described above, it is possible to obtain the similar effects with those of the first embodiment and to reduce resistance in conveying a document by rotatably disposing the driven rollers ro respectively at the first edge corner A and the second edge corner B of the upstream conveyance guide 400 and the third edge corner K. That is, when the document D is conveyed while being pulled by the conveyance roller pair 8 and the conveyance roller pair 9, it is possible to obtain an effect that the resistance of the document D receiving from the upstream conveyance guide 400 can be reduced as much as possible.

While the driven rollers ro at the first edge corner A, the second edge corner B, and the third edge corner K are disposed at three places in the main scan direction in the present embodiment, the driven rollers ro may be attached uniformly in the main scan direction of the second image reading portion 201 in the upstream conveyance guide 400. Still further, the driven rollers ro may be attached partially by exceeding the three places.

Figure 16:
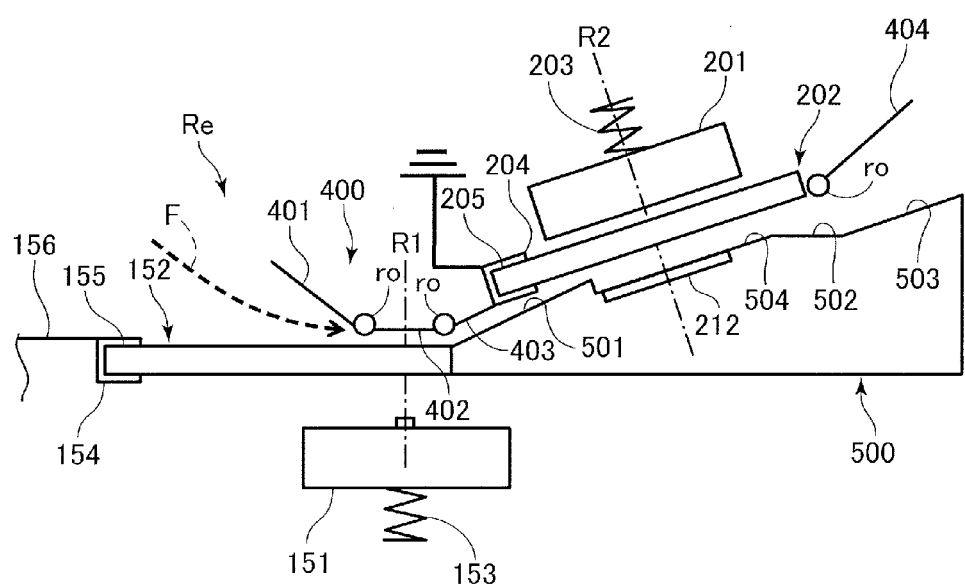
FIG. 16 is an enlarged diagram illustrating another mode of the image reading portion.

It is noted that FIG. 16 is an enlarged view illustrating another mode of the image reading portion. As illustrated in FIG. 16, it is possible to dispose the driven rollers ro driven by the move of the document D being conveyed respectively at the first edge corner A and the second edge corner B, and the third edge corner K of the upstream conveyance guide 400 in the third embodiment described above. In such a case, a known rotary supporting structure may be used as a structure for supporting those driven rollers ro by the upstream conveyance guide 400.

This arrangement makes it possible to obtain the same effect with the second embodiment and to reduce the resistance in conveying the document by rotatably disposing the respectively driven rollers ro at the first edge corner A, the second edge corner B, and the third edge corner K of the upstream conveyance guide 400. That is, it is possible to obtain the effect of reducing the resistance of the document D receiving from the upstream conveyance guide 400 as much as possible when the document D is conveyed while being pulled by the conveyance roller pair 8 and the conveyance roller pair 9.

Still further, while the driven rollers ro at the first edge corner A, the second edge corner B, and the third edge corner K are disposed at the three places in the main scan direction, the driven rollers ro may be attached uniformly in the main scan direction of the second image reading portion 201 in the upstream conveyance guide 400. Still further, driven rollers ro may be also attached partially exceeding the three places.

It is noted that it is possible to provide the first gap forming member 470, the second gap forming member 570, and the moving guide unit 550 of the second embodiment also in the fourth embodiment. Still further, the driven roller may be also provided at an edge corner formed by the inclined guide surface 551 and the parallel guide surface 552 in the moving guide unit 550. Also, the second image reading portion 201 may be disposed upstream in the sheet conveying direction of the first image reading portion 151.

It is noted that while the first through third embodiments described above have been described by exemplifying the electro-photographic image forming apparatus 101, the present invention is also applicable to an ink jet type image forming apparatus forming an image on a sheet by discharging ink droplet from a nozzle.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2015-113628, filed Jun. 4, 2015, and 2016-097063, filed May 13, 2016, which are hereby incorporated by reference herein in their entirety.

What is claimed is:

1. An image reading apparatus comprising:
a body unit comprising:
a first transparent member; and
a first image reading portion configured to read an image of a first surface of a sheet conveyed through a sheet conveyance path through the first transparent member;
an openable unit configured to open with respect to the body unit, the openable unit comprising:
a second transparent member; and
a second image reading portion disposed on an opposite side of the first image reading portion across the sheet conveyance path, the second image reading portion being configured to read an image of a second surface, opposite to the first surface, of the sheet conveyed through the sheet conveyance path through the second transparent member;
a moving guide portion provided in the body unit, disposed to face the second transparent member across the sheet conveyance path, and being movable toward the second transparent member;
an urging member provided in the body unit and urging the moving guide portion toward the second transparent member; and
a gap forming member provided on either one of the second transparent member and the moving guide portion, the gap forming member being configured to abut with another one of the second transparent member and the moving guide portion, and to provide a gap through which a sheet passes between the second transparent member and the moving guide portion.

2. The image reading apparatus according to claim 1, wherein the gap forming member is one of a plurality of gap forming members, and the plurality of gap forming members is disposed at positions outside of the sheet conveyance path in a direction intersecting with a sheet conveyance direction so as to interpose the sheet conveyance path between them.

3. The image reading apparatus according to claim 2, wherein the urging member rockably supports the moving guide portion such that edges, in the direction intersecting with the sheet conveyance direction, of the moving guide portion are able to rock vertically.

4. The image reading apparatus according to claim 1, wherein the second image reading portion is disposed downstream, in the sheet conveyance direction, of the first image reading portion,
wherein the body unit comprises a first conveyance guide portion with a first inclined guide surface inclined to guide a leading edge of a sheet passing on the first transparent member in a direction in which the leading edge of the sheet abuts against the second transparent member, and
wherein the openable unit comprises a second conveyance guide portion with a second inclined guide surface disposed to face the first conveyance guide portion and inclined to guide the leading edge of the sheet being conveyed in a direction in which the leading edge of the sheet abuts against the first transparent member.

5. The image reading apparatus according to claim 4, wherein the moving guide portion is disposed downstream, in the sheet conveyance direction, of the first conveyance guide portion so as to be adjacent with each other and at a position where an upstream end, in the sheet conveyance direction, of the moving guide portion becomes distant from the second transparent member more than a downstream end of the first conveyance guide portion.

6. The image reading apparatus according to claim 4, wherein a first extension line extending straightly in an inclination direction of the first inclined guide surface intersects with the first transparent member upstream, in the sheet conveyance direction, of a first image reading position of the first image reading portion.

7. The image reading apparatus according to claim 6, further comprising a first gap forming member provided on either one of the first transparent member and the second conveyance guide portion and being in contact with the other one of the first transparent member and the second conveyance guide portion to form a gap through which the sheet can pass between the first transparent member and the second conveyance guide portion,
wherein the gap forming member being in contact with the other one of the second transparent member and the moving guide portion is a second gap forming member.

8. The image reading apparatus according to claim 7, wherein the first gap forming member is disposed outside of the sheet conveyance path in a direction intersecting with the sheet conveyance direction.

9. The image reading apparatus according to claim 4, wherein a second extension line extending straightly in an inclination direction of the second inclined guide surface intersects with the first transparent member upstream in the sheet conveyance direction of the first image reading position of the first image reading portion.

10. The image reading apparatus according to claim 9, further comprising:
a first driven rotator driven by being in contact with the sheet and disposed at a first edge corner of the second conveyance guide which is located on an upstream end, in the sheet conveyance direction, of a parallel guide surface of the second conveyance guide facing the first transparent member;
a second driven rotator driven by being in contact with the sheet and disposed at a second edge corner of the second conveyance guide which is located on a downstream end of a parallel guide surface; and
a third driven rotator driven by being in contact with the sheet and disposed at a third edge corner of the second conveyance guide which is located downstream of the second transparent member.

11. The image reading apparatus according to claim 10, wherein the first conveyance guide portion comprises an opposed guide surface facing the second transparent member with a gap and continuous to the first inclined guide surface, and
wherein the second image reading portion, the second transparent member, and the opposed guide surface are inclined with respect to the first transparent member so as to rise toward downstream in the sheet conveyance direction.

12. The image reading apparatus according to claim 11, further comprising a fourth driven rotator driven by being in contact with the sheet and disposed at a fourth edge corner of the second conveyance guide which is located on an upstream end, in the sheet conveyance direction, of the opposed guide surface, the fourth edge corner being positioned at a level higher than that of the second edge corner.

13. The image reading apparatus according to claim 1, further comprising:
a first conveyance rotator pair disposed upstream, in the sheet conveyance direction, of the first image reading portion in the sheet conveyance path and conveying the sheet to the first image reading portion; and
a second conveyance rotator pair disposed downstream in the sheet conveyance direction of the second image reading portion in the sheet conveyance path and conveying the sheet that has passed through the first and second image reading portions.

14. The image reading apparatus according to claim 13, wherein sheet conveyance velocities of first and second conveyance rotator pairs are set so as to meet a relationship of $V1 \leq V2$,
where $V1$ is the sheet conveyance velocity of the first conveyance rotator pair and $V2$ is the sheet conveyance velocity of the second conveyance rotator pair.

15. The image reading apparatus according to claim 13, wherein the conveyance direction of the sheet of the first conveyance rotator pair contains a vertically downward component, and the conveyance direction of the sheet of the second conveyance rotator pair contains an vertically upward component.

16. The image reading apparatus according to claim 1, wherein the first and second transparent members are grounded by conductive coating treatments applied on the respective surfaces of the first and second transparent members.

17. An image forming apparatus comprising:
an image reading apparatus; and
an image forming portion,
wherein the image reading apparatus comprises:
a body unit comprising:
a first transparent member; and
a first image reading portion configured to read an image of a first surface of a sheet conveyed through a sheet conveyance path through the first transparent member;
an openable unit configured to open with respect to the body unit, the openable unit comprising:
a second transparent member; and
a second image reading portion disposed on an opposite side of the first image reading portion across the sheet conveyance path, the second image reading portion being configured to read an image of a second surface, opposite to the first surface, of the sheet conveyed through the sheet conveyance path through the second transparent member;
a moving guide portion provided in the body unit, disposed to face the second transparent member across the sheet conveyance path, and being movable toward the second transparent member;
an urging member provided in the body unit and urging the moving guide portion toward the second transparent member; and
a gap forming member provided on either one of the second transparent member and the moving guide portion, the gap forming member being configured to abut with another one of the second transparent member and the moving guide portion, and to provide a gap through which a sheet passes between the second transparent member and the moving guide portion;
and wherein the image forming portion forms an image onto another sheet based on image information read by the image reading apparatus.

* * * * *